US012550938B2

(12) United States Patent
Watson et al.

(10) Patent No.: US 12,550,938 B2
(45) Date of Patent: Feb. 17, 2026

(54) AEROSOL DELIVERY DEVICES INCLUDING A SELECTOR AND RELATED METHODS

(71) Applicant: RAI Strategic Holdings, Inc., Winston-Salem, NC (US)

(72) Inventors: Nicholas H. Watson, Westfield, NC (US); Michael F. Davis, Clemmons, NC (US); Stephen Benson Sears, Siler City, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 98 days.

(21) Appl. No.: 17/242,894

(22) Filed: Apr. 28, 2021

(65) Prior Publication Data

US 2021/0244098 A1 Aug. 12, 2021

Related U.S. Application Data

(63) Continuation of application No. 15/222,615, filed on Jul. 28, 2016, now Pat. No. 11,019,847.

(51) Int. Cl.
*A24B 15/28* (2006.01)
*A24F 40/10* (2020.01)
(Continued)

(52) U.S. Cl.
CPC ............ *A24F 40/46* (2020.01); *A24B 15/283* (2013.01); *A24F 40/485* (2020.01); *H05B 1/0297* (2013.01); *A24F 40/10* (2020.01)

(58) Field of Classification Search
CPC ........ A24F 40/46; A24F 40/485; A24F 40/10; H05B 1/0297; A24B 15/283
(Continued)

(56) References Cited

U.S. PATENT DOCUMENTS

| | | | | |
|---|---|---|---|---|
| 1,771,366 A * | 7/1930 | Wyss | .................. | A61M 16/108 128/203.22 |
| 2,057,353 A | 10/1936 | Whittemore, Jr. | | |

(Continued)

FOREIGN PATENT DOCUMENTS

| | | |
|---|---|---|
| AU | 276250 A | 7/1965 |
| CA | 2641869 A1 | 5/2010 |

(Continued)

OTHER PUBLICATIONS

Liu, Translation of CN-203676141-U, Jul. 2, 2014.*

(Continued)

*Primary Examiner* — Eric S Stapleton

(74) *Attorney, Agent, or Firm* — Womble Bond Dickinson (US) LLP

(57) ABSTRACT

The present disclosure relates to aerosol delivery devices. The aerosol delivery devices may include multiple atomizers and an atomizer selector that provides for selection of one or more of the atomizers to which electrical current is directed. The atomizer selector may also alter a position of the atomizers relative to an airflow path through the aerosol delivery device. Another aerosol delivery device may include an atomizer and an additive selector that provides for selection of one or more additives added to vapor produced by the atomizer. Related methods are also provided.

24 Claims, 33 Drawing Sheets

(51) Int. Cl.

| | |
|---|---|
| *A24F 40/30* | (2020.01) |
| *A24F 40/40* | (2020.01) |
| *A24F 40/46* | (2020.01) |
| *A24F 40/485* | (2020.01) |
| *H05B 1/02* | (2006.01) |

(58) Field of Classification Search
USPC .......................................................... 392/387
See application file for complete search history.

(56) References Cited

U.S. PATENT DOCUMENTS 2,104,266 A * 1/1938 Mccormick ........... A24F 40/485 131/330
3,200,819 A * 8/1965 Gilbert .................. A24F 40/485 131/273
3,289,949 A * 12/1966 Roth ...................... A61M 11/06 222/394
3,730,437 A * 5/1973 Rousselot .............. B65D 83/66 222/635
4,273,142 A * 6/1981 Swanson ................... A24F 7/04 131/339
4,284,089 A * 8/1981 Ray ......................... A24F 42/60 131/270
4,303,083 A * 12/1981 Burruss, Jr. ........... A61M 15/06 131/194
4,462,397 A * 7/1984 Suzuki .............. A61M 16/0833 128/911
4,594,969 A * 6/1986 Przybylski .............. B01F 25/30 123/25 E
4,735,217 A * 4/1988 Gerth ...................... A24F 40/50 131/273
4,790,305 A * 12/1988 Zoltan ............... A61M 15/0088 128/200.23
4,805,609 A * 2/1989 Roberts ................. A61M 16/16 239/338
4,848,374 A * 7/1989 Chard ..................... A24F 42/10 131/194
4,907,606 A * 3/1990 Lilja ...................... A24B 15/42 131/194
4,922,901 A * 5/1990 Brooks ............... A61M 16/109 131/273
4,945,931 A * 8/1990 Gori ...................... A24F 40/485 131/194
4,947,874 A * 8/1990 Brooks ................... A24F 40/50 131/194
4,947,875 A 8/1990 Brooks et al.
4,972,855 A 11/1990 Kuriyama et al.
4,986,286 A 1/1991 Roberts et al.
4,993,436 A 2/1991 Bloom, Jr.
5,019,122 A 5/1991 Clearman et al.
5,042,510 A 8/1991 Curtiss et al.
5,060,671 A 10/1991 Counts et al.
5,093,894 A 3/1992 Deevi et al.
5,137,034 A 8/1992 Perfetti et al.
5,144,962 A 9/1992 Counts et al.
5,179,966 A 1/1993 Losee et al.
5,249,586 A 10/1993 Morgan et al.
5,261,424 A 11/1993 Sprinkel, Jr.
5,322,075 A 6/1994 Deevi et al.
5,353,813 A 10/1994 Deevi et al.
5,369,723 A 11/1994 Counts et al.
5,372,148 A 12/1994 McCafferty et al.
5,388,574 A 2/1995 Ingebrethsen
5,408,574 A 4/1995 Deevi et al.
5,468,936 A 11/1995 Deevi et al.
5,490,630 A 2/1996 Hecker
5,498,850 A 3/1996 Das
5,515,842 A 5/1996 Ramseyer et al.
5,530,225 A 6/1996 Hajaligol
5,564,442 A 10/1996 MacDonald et al.
5,649,554 A 7/1997 Sprinkel et al.
5,666,977 A 9/1997 Higgins et al.
5,687,746 A 11/1997 Rose et al.
5,726,421 A 3/1998 Fleischhauer et al.
5,727,571 A 3/1998 Meiring et al.
5,743,251 A 4/1998 Howell et al.
5,799,663 A 9/1998 Gross et al.
5,819,756 A 10/1998 Mielordt
5,865,185 A 2/1999 Collins et al.
5,865,186 A 2/1999 Volsey, II
5,878,752 A 3/1999 Adams et al.
5,894,841 A 4/1999 Voges
5,934,289 A 8/1999 Watkins et al.
5,954,979 A 9/1999 Counts et al.
5,967,148 A 10/1999 Harris et al.
6,040,560 A 3/2000 Fleischhauer et al.
6,053,176 A 4/2000 Adams et al.
6,089,857 A 7/2000 Matsuura et al.
6,095,153 A 8/2000 Kessler et al.
6,125,853 A 10/2000 Susa et al.
6,155,268 A 12/2000 Takeuchi
6,164,287 A 12/2000 White
6,167,880 B1 1/2001 Gonda et al.
6,196,218 B1 3/2001 Voges
6,196,219 B1 3/2001 Hess et al.
6,231,796 B1 * 5/2001 Allen .................. B29C 43/3642 264/72
6,234,167 B1 5/2001 Cox et al.
6,357,671 B1 3/2002 Cewers
6,398,992 B1 * 6/2002 Jacobson ............ B29C 33/3821 264/108
6,516,796 B1 * 2/2003 Cox ........................ A24F 40/50 128/200.23
6,598,607 B2 7/2003 Adiga et al.
6,601,776 B1 8/2003 Oljaca et al.
6,615,840 B1 9/2003 Fournier et al.
6,688,313 B2 2/2004 Wrenn et al.
6,709,524 B2 3/2004 Kawashima
6,770,721 B1 * 8/2004 Kim ...................... B29C 33/405 526/329
6,772,756 B2 8/2004 Shayan
6,803,545 B2 10/2004 Blake et al.
6,854,461 B2 2/2005 Nichols et al.
6,854,470 B1 2/2005 Pu
7,117,867 B2 10/2006 Cox et al.
7,293,565 B2 11/2007 Griffin et al.
7,513,253 B2 4/2009 Kobayashi et al.
7,581,540 B2 9/2009 Hale et al.
7,775,459 B2 8/2010 Martens, III et al.
7,832,410 B2 11/2010 Hon
7,845,359 B2 12/2010 Montaser
7,896,006 B2 3/2011 Hamano et al.
8,127,772 B2 3/2012 Montaser
8,146,587 B2 4/2012 Flickinger et al.
8,162,921 B2 4/2012 Flickinger et al.
8,314,591 B2 11/2012 Terry et al.
8,365,742 B2 2/2013 Hon
8,402,976 B2 3/2013 Fernando et al.
8,499,766 B1 8/2013 Newton
8,528,569 B1 9/2013 Newton
8,545,463 B2 10/2013 Collins, Jr. et al.
8,550,069 B2 10/2013 Alelov
8,851,081 B2 10/2014 Fernando et al.
8,881,737 B2 11/2014 Collett et al.
8,925,544 B2 1/2015 Flickinger
9,132,248 B2 9/2015 Qiu
9,210,738 B2 12/2015 Ward et al.
9,277,770 B2 3/2016 DePiano et al.
9,402,947 B2 8/2016 Flickinger
9,440,020 B2 9/2016 Flickinger et al.
11,001,014 B2 * 5/2021 Register ................ B29C 70/544
2002/0146242 A1 10/2002 Vieira
2003/0226837 A1 12/2003 Blake et al.
2004/0118401 A1 6/2004 Smith et al.
2004/0129280 A1 7/2004 Woodson et al.
2004/0200488 A1 10/2004 Felter et al.
2004/0226568 A1 11/2004 Takeuchi et al.
2005/0016550 A1 1/2005 Katase
2005/0172976 A1 8/2005 Newman et al.
2005/0194474 A1 9/2005 Sakakibara et al.
2006/0016453 A1 1/2006 Kim
2006/0065755 A1 3/2006 Sugita et al.

(56) References Cited

U.S. PATENT DOCUMENTS

2006/0191548 A1 8/2006 Strickland et al.
2006/0196518 A1 9/2006 Hon
2007/0074734 A1 4/2007 Braunshteyn et al.
2007/0102013 A1 5/2007 Adams et al.
2007/0186942 A1 8/2007 Strickland et al.
2007/0186943 A1 8/2007 Strickland et al.
2007/0186944 A1 8/2007 Strickland et al.
2007/0212477 A1 9/2007 Feng et al.
2007/0215167 A1 9/2007 Llewellyn Crooks et al.
2008/0054099 A1* 3/2008 Giroux .................. B05B 7/2429 96/4
2008/0085103 A1 4/2008 Beland et al.
2008/0092912 A1 4/2008 Robinson et al.
2008/0128145 A1 6/2008 Butz et al.
2008/0257367 A1 10/2008 Paterno et al.
2008/0276947 A1 11/2008 Martzel
2008/0302374 A1 12/2008 Wengert et al.
2009/0065010 A1 3/2009 Shands
2009/0095311 A1 4/2009 Han
2009/0095312 A1 4/2009 Herbrich et al.
2009/0126745 A1 5/2009 Hon
2009/0188490 A1 7/2009 Han
2009/0192443 A1 7/2009 Collins, Jr.
2009/0212133 A1 8/2009 Collins, Jr.
2009/0230117 A1 9/2009 Fernando et al.
2009/0272379 A1 11/2009 Thorens et al.
2009/0283103 A1 11/2009 Nielsen et al.
2009/0320863 A1 12/2009 Fernando et al.
2009/0324206 A1 12/2009 Young et al.
2010/0043809 A1 2/2010 Magnon
2010/0083959 A1 4/2010 Siller
2010/0200006 A1 8/2010 Robinson et al.
2010/0206225 A1 8/2010 Yamada
2010/0229881 A1 9/2010 Hearn
2010/0242974 A1 9/2010 Pan
2010/0307518 A1 12/2010 Wang
2010/0313901 A1 12/2010 Fernando et al.
2011/0005535 A1 1/2011 Xiu
2011/0011396 A1 1/2011 Fang
2011/0036363 A1 2/2011 Urtsev et al.
2011/0036365 A1 2/2011 Chong et al.
2011/0094523 A1 4/2011 Thorens et al.
2011/0101126 A1 5/2011 Kronsteiner
2011/0126848 A1 6/2011 Zuber et al.
2011/0155153 A1 6/2011 Thorens et al.
2011/0155718 A1 6/2011 Greim et al.
2011/0168194 A1 7/2011 Hon
2011/0265806 A1 11/2011 Alarcon et al.
2011/0309157 A1 12/2011 Yang et al.
2012/0042885 A1 2/2012 Stone et al.
2012/0060853 A1 3/2012 Robinson et al.
2012/0111347 A1 5/2012 Hon
2012/0132643 A1 5/2012 Choi et al.
2012/0167906 A1 7/2012 Gysland
2012/0179122 A1 7/2012 Eilat et al.
2012/0227752 A1 9/2012 Alelov
2012/0231464 A1 9/2012 Yu et al.
2012/0241535 A1 9/2012 Carriere et al.
2012/0255546 A1 10/2012 Goetz et al.
2012/0260927 A1 10/2012 Liu
2012/0279512 A1 11/2012 Hon
2012/0312313 A1* 12/2012 Frija ....................... A24F 40/42 131/329
2012/0318882 A1 12/2012 Abehasera
2012/0325227 A1 12/2012 Robinson et al.
2013/0037041 A1 2/2013 Worm et al.
2013/0056013 A1 3/2013 Terry et al.
2013/0074857 A1 3/2013 Buchberger
2013/0081625 A1 4/2013 Rustad et al.
2013/0081642 A1 4/2013 Safari
2013/0140374 A1* 6/2013 Adams .................... B05B 12/14 239/8
2013/0192619 A1 8/2013 Tucker et al.
2013/0192621 A1 8/2013 Li et al.
2013/0228191 A1 9/2013 Newton
2013/0239983 A1 9/2013 Burke et al.
2013/0255702 A1 10/2013 Griffith, Jr. et al.
2013/0306084 A1 11/2013 Flick
2013/0319439 A1* 12/2013 Gorelick ................. A24F 13/02 131/329
2013/0340750 A1 12/2013 Thorens et al.
2013/0340775 A1* 12/2013 Juster ...................... A24F 40/65 131/273
2014/0000638 A1 1/2014 Sebastian et al.
2014/0007893 A1 1/2014 Burke et al.
2014/0034072 A1 2/2014 Robertson et al.
2014/0060554 A1 3/2014 Collett et al.
2014/0060555 A1 3/2014 Chang et al.
2014/0069424 A1* 3/2014 Poston .................. A61M 15/06 128/202.21
2014/0076310 A1 3/2014 Newton
2014/0096781 A1 4/2014 Sears et al.
2014/0096782 A1 4/2014 Ampolini et al.
2014/0109921 A1 4/2014 Chen
2014/0123990 A1 5/2014 Timmermans
2014/0157583 A1 6/2014 Ward et al.
2014/0182609 A1 7/2014 Liu
2014/0190503 A1 7/2014 Li et al.
2014/0207016 A1 7/2014 Addington et al.
2014/0209105 A1 7/2014 Sears et al.
2014/0253144 A1 9/2014 Novak, III et al.
2014/0261408 A1 9/2014 DePiano et al.
2014/0261486 A1 9/2014 Potter et al.
2014/0261487 A1 9/2014 Chapman et al.
2014/0261495 A1 9/2014 Novak, III et al.
2014/0270727 A1 9/2014 Ampolini et al.
2014/0270729 A1 9/2014 DePiano et al.
2014/0270730 A1 9/2014 DePiano et al.
2014/0283856 A1 9/2014 Xiang
2014/0286002 A1 9/2014 Liu
2014/0290612 A1 10/2014 Guinther
2014/0311504 A1 10/2014 Liu
2014/0318558 A1 10/2014 Liu
2014/0332019 A1 11/2014 Liu
2014/0345631 A1 11/2014 Bowen et al.
2014/0366898 A1 12/2014 Monsees et al.
2014/0373857 A1 12/2014 Steinberg
2015/0007838 A1 1/2015 Fernando et al.
2015/0027471 A1 1/2015 Feldman et al.
2015/0047662 A1 2/2015 Hopps
2015/0053217 A1 2/2015 Steingraber et al.
2015/0059787 A1* 3/2015 Qiu .......................... H05B 3/14 392/395
2015/0075545 A1 3/2015 Xiang
2015/0101606 A1* 4/2015 White ................... A61M 15/00 131/194
2015/0101625 A1 4/2015 Newton et al.
2015/0114407 A1 4/2015 Duncan et al.
2015/0114410 A1 4/2015 Doster
2015/0117841 A1 4/2015 Brammer et al.
2015/0117842 A1 4/2015 Brammer et al.
2015/0157052 A1 6/2015 Ademe et al.
2015/0196059 A1 7/2015 Liu
2015/0201674 A1 7/2015 Dooly et al.
2015/0216236 A1 8/2015 Bless et al.
2015/0223522 A1 8/2015 Ampolini et al.
2015/0245654 A1 9/2015 Memari et al.
2015/0245659 A1 9/2015 DePiano et al.
2015/0257445 A1 9/2015 Henry, Jr. et al.
2015/0272221 A1 10/2015 Liu
2015/0282527 A1 10/2015 Henry, Jr.
2015/0335070 A1 11/2015 Sears et al.
2015/0335071 A1 11/2015 Brinkley et al.
2015/0357839 A1 12/2015 Cai et al.
2015/0374035 A1 12/2015 Sanchez et al.
2016/0007650 A1 1/2016 Duncan et al.
2016/0007652 A1 1/2016 Taluskie et al.
2016/0037826 A1 2/2016 Hearn et al.
2016/0050975 A1 2/2016 Worm et al.
2016/0073695 A1 3/2016 Sears et al.
2016/0089508 A1 3/2016 Smith et al.
2016/0095356 A1 4/2016 Chan
2016/0100633 A1 4/2016 Gao
2016/0106936 A1 4/2016 Kimmel

(56) References Cited

U.S. PATENT DOCUMENTS

| | | | |
|---|---|---|---|
| 2016/0120224 A1 | 5/2016 | Mishra et al. | |
| 2016/0150821 A1 | 6/2016 | Liu | |
| 2016/0198771 A1 | 7/2016 | Goggin et al. | |
| 2016/0206001 A1 | 7/2016 | Eng et al. | |
| 2016/0219937 A1 | 8/2016 | Rado | |
| 2016/0242463 A1 | 8/2016 | Liu | |
| 2016/0262453 A1 | 9/2016 | Ampolini et al. | |
| 2016/0262454 A1 | 9/2016 | Sears et al. | |
| 2016/0262457 A1* | 9/2016 | Borkovec | A61M 15/002 |
| 2016/0278434 A1 | 9/2016 | Liu | |
| 2016/0309780 A1 | 10/2016 | Chen et al. | |
| 2017/0311644 A1 | 11/2017 | Collett et al. | |
| 2018/0020730 A1 | 1/2018 | Alarcon et al. | |
| 2018/0199627 A1 | 7/2018 | Bowen et al. | |
| 2019/0030842 A1* | 1/2019 | Miranda | B29C 70/44 |
| 2019/0176410 A1* | 6/2019 | Register | B64F 5/10 |
| 2020/0406512 A1* | 12/2020 | Kuo | B29C 43/3642 |

FOREIGN PATENT DOCUMENTS

| | | | | |
|---|---|---|---|---|
| CN | 1541577 | A | | 11/2004 |
| CN | 2719043 | Y | | 8/2005 |
| CN | 200997909 | Y | | 1/2008 |
| CN | 101116542 | A | | 2/2008 |
| CN | 101176805 | A | | 5/2008 |
| CN | 201379072 | Y | | 1/2010 |
| CN | 203378558 | | | 1/2014 |
| CN | 103783673 | | | 5/2014 |
| CN | 203676141 | U | * | 7/2014 |
| CN | 203709257 | | | 7/2014 |
| CN | 203789150 | | | 8/2014 |
| CN | 203828083 | | | 9/2014 |
| CN | 203873006 | | | 10/2014 |
| CN | 204104838 | | | 1/2015 |
| CN | 204351068 | | | 5/2015 |
| CN | 204949526 | | | 1/2016 |
| CN | 109788803 | | | 5/2019 |
| DE | 102006004484 | A1 | | 8/2007 |
| DE | 102006041042 | A1 | | 3/2008 |
| DE | 202009010400 | U1 | | 11/2009 |
| EP | 0295122 | A2 | | 12/1988 |
| EP | 0430566 | A2 | | 6/1991 |
| EP | 0845220 | A1 | | 6/1998 |
| EP | 1618803 | A1 | | 1/2006 |
| EP | 2316286 | A1 | | 5/2011 |
| EP | 2589306 | A1 | | 5/2013 |
| EP | 2989912 | A1 | | 3/2016 |
| GB | 259727 | A | | 10/1926 |
| GB | 2469850 | A | | 11/2010 |
| GB | 2529727 | | | 3/2016 |
| JP | 2014528718 | A | | 10/2014 |
| JP | 2016509879 | A | | 4/2016 |
| KR | 10-2003-0008318 | | | 1/2003 |
| RU | 103062 | U1 | | 3/2011 |
| WO | WO-1997048293 | A1 | | 12/1997 |
| WO | WO-2003034847 | A1 | | 5/2003 |
| WO | WO-2004043175 | A1 | | 5/2004 |
| WO | WO-2004080216 | A1 | | 9/2004 |
| WO | WO-2005099494 | A1 | | 10/2005 |
| WO | WO-2007078273 | A1 | | 7/2007 |
| WO | WO-2007131449 | A1 | | 11/2007 |
| WO | WO-2009105919 | A1 | | 9/2009 |
| WO | WO-2009155734 | A1 | | 12/2009 |
| WO | WO-2010003480 | A1 | | 1/2010 |
| WO | WO-2010045670 | A1 | | 4/2010 |
| WO | WO-2010073122 | A1 | | 7/2010 |
| WO | WO-2010118644 | A1 | | 10/2010 |
| WO | WO-2010140937 | A1 | | 12/2010 |
| WO | WO-2011010334 | A1 | | 1/2011 |
| WO | WO-2012072762 | A1 | | 6/2012 |
| WO | WO-2012100523 | A1 | | 8/2012 |
| WO | WO-2013089551 | A1 | | 6/2013 |
| WO | 2015052192 | A1 | | 4/2015 |
| WO | WO-2015149647 | A1 | | 10/2015 |
| WO | 2016062777 | A1 | | 4/2016 |
| WO | WO-2016090426 | A1 | | 6/2016 |
| WO | WO-2016096497 | A1 | | 6/2016 |

OTHER PUBLICATIONS

WIPO, Partial International Search Report, PCT/IB2017/054549, mailed Nov. 23, 2017.

Geiss, Otmar, "Correlation of volatile carbonyl yields emitted by e-cigarettes with the temperature of the heating coil and the perceived sensorial quality of the generated vapours," International Journal of Hygiene and Environmental Health, May 31, 2016, pp. 268-277.

Notice of Reasons for Rejection mailed May 14, 2024, in corresponding Japanese Application No. 2023-039331.

* cited by examiner

AEROSOL DELIVERY DEVICES INCLUDING A SELECTOR AND RELATED METHODS

CROSS-REFERENCE TO RELATED APPLICATIONS

This application is a continuation of U.S. application Ser. No. 15/222,615, filed Jul. 28, 2016, which is hereby incorporated by reference herein in its entirety.

BACKGROUND

Field of the Disclosure

The present disclosure relates to aerosol delivery devices such as electronic cigarettes, and more particularly to aerosol delivery devices including an atomizer. The atomizer may be configured to heat an aerosol precursor composition, which may be made or derived from tobacco or otherwise incorporate tobacco, to form an inhalable substance for human consumption.

Description of Related Art

Many devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous alternative smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 8,881,737 to Collett et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0096781 to Sears et al., U.S. Pat. App. Pub. No. 2014/0096782 to Ampolini et al., and U.S. Pat. App. Pub. No. 2015/0059780 to Davis et al., which are incorporated herein by reference in their entireties. See also, for example, the various embodiments of products and heating configurations described in the background sections of U.S. Pat. No. 5,388,594 to Counts et al. and U.S. Pat. No. 8,079,371 to Robinson et al., which are incorporated by reference in their entireties.

However, it may be desirable to provide aerosol delivery devices with additional user control or customization. Thus, advances with respect to aerosol delivery device functionality may be desirable.

BRIEF SUMMARY OF THE DISCLOSURE

The present disclosure relates to assembly of cartridges for aerosol delivery devices configured to produce aerosol and which aerosol delivery devices, in some embodiments, may be referred to as electronic cigarettes. In one aspect, an aerosol delivery device is provided. The aerosol delivery device may include a plurality of atomizers each configured to be in fluid communication with a respective one of a plurality of reservoirs containing an aerosol precursor composition. Further, the aerosol delivery device may include an atomizer selector. The atomizer selector may be configured to provide for selection of one or more of the atomizers to which electrical current is directed to produce a vapor therefrom and alter a position of the atomizers with respect to an airflow path through the aerosol delivery device.

In some embodiments the atomizer selector may include a valve configured to selectively direct the airflow path at one or more of the atomizers. The atomizer selector may be configured to selectively form an electrical connection with one or more of the atomizers. The atomizer selector may include a guide track and each of the atomizers may be moveable relative to the guide track. The aerosol delivery device may further include an additive selector configured to provide for selection of one or more of a plurality of additives added to the vapor.

In an additional aspect an aerosol delivery device is provided. The aerosol delivery device may include at least one atomizer configured to produce a vapor from an aerosol precursor composition. Further, the aerosol delivery device may include an additive selector configured to provide for selection of one or more of a plurality of additives added to the vapor.

In some embodiments the additive selector may include a bed of solids. The bed of solids may be positioned downstream of the at least one atomizer in terms of an airflow path. The bed of solids may include a plurality of compartments separated by one or more partitions. The aerosol delivery device may further include a flow director. The additive selector may be configured to selectively align the flow director with one or more of the compartments. The additive selector may further include one or more additive heating elements configured to selectively heat one or more portions of the bed of solids. The bed of solids may include a plurality of flavor-laden plastic solids.

In some embodiments the at least one atomizer may include a Venturi nozzle. The additive selector may include a plurality of channels each configured to be in fluid communication with one of a plurality of additive reservoirs and selectively configurable to be in fluid communication with the Venturi nozzle. The additive selector may include at least one crystal oscillator. The at least one atomizer may include a plurality of atomizers each configured to be in fluid communication with a respective one of a plurality of reservoirs. The aerosol delivery device may further include an atomizer selector configured to provide for selection of one or more of the atomizers to which electrical current is directed to produce the vapor therefrom and alter a position of the atomizers with respect to an airflow path through the aerosol delivery device.

In an additional aspect a method for vapor production with an aerosol delivery device is provided. The method may include providing for selection of one or more of a plurality of atomizers. The method may additionally include altering a position of the atomizers with respect to an airflow path through the aerosol delivery device. Further, the method may include directing electrical current to the one or more of the atomizers selected to produce a vapor.

In some embodiments altering a position of the atomizers with respect to the airflow path through the aerosol delivery device may include selectively directing the airflow path at the one or more of the atomizers selected with the valve. Directing electrical current to the one or more of the atomizers selected to produce the vapor may include selectively forming an electrical connection with the one or more of the atomizers selected. The method may further include providing for selection of one or more of a plurality of additives and adding the one or more additives selected to the vapor.

In an additional aspect a method for vapor production with an aerosol delivery device is provided. The method may include providing for selection of one or more of a plurality of additives. Further, the method may include producing a vapor with at least one atomizer from an aerosol precursor composition. The method may additionally include adding the one or more additives selected to the vapor.

In some embodiments the method may further include forming the one or more additives from a bed of solids. Providing for selection of one or more of the additives may include providing for selective alignment of a Venturi nozzle with one or more channels respectively in fluid communication with one of a plurality of additive reservoirs. Adding the one or more additives selected to the vapor may include activating at least one crystal oscillator. Producing the vapor with at least one atomizer may include providing for selection of one or more of a plurality of atomizers. The method may further include altering a position of the atomizers with respect to an airflow path through the aerosol delivery device and directing electrical current to the one or more of the atomizers selected to produce a vapor.

These and other features, aspects, and advantages of the disclosure will be apparent from a reading of the following detailed description together with the accompanying drawings, which are briefly described below.

BRIEF DESCRIPTION OF THE FIGURES

Figure 1:
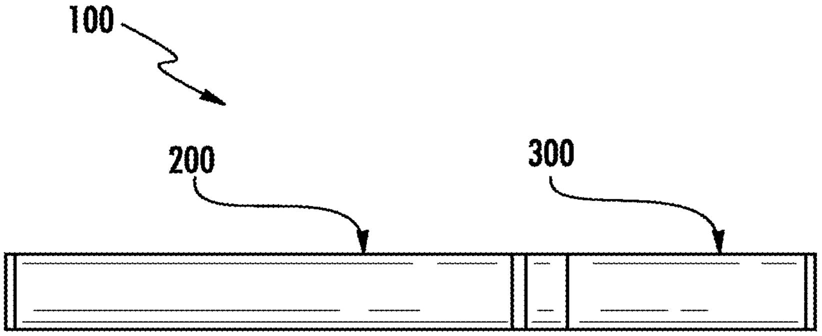
Figure 2:
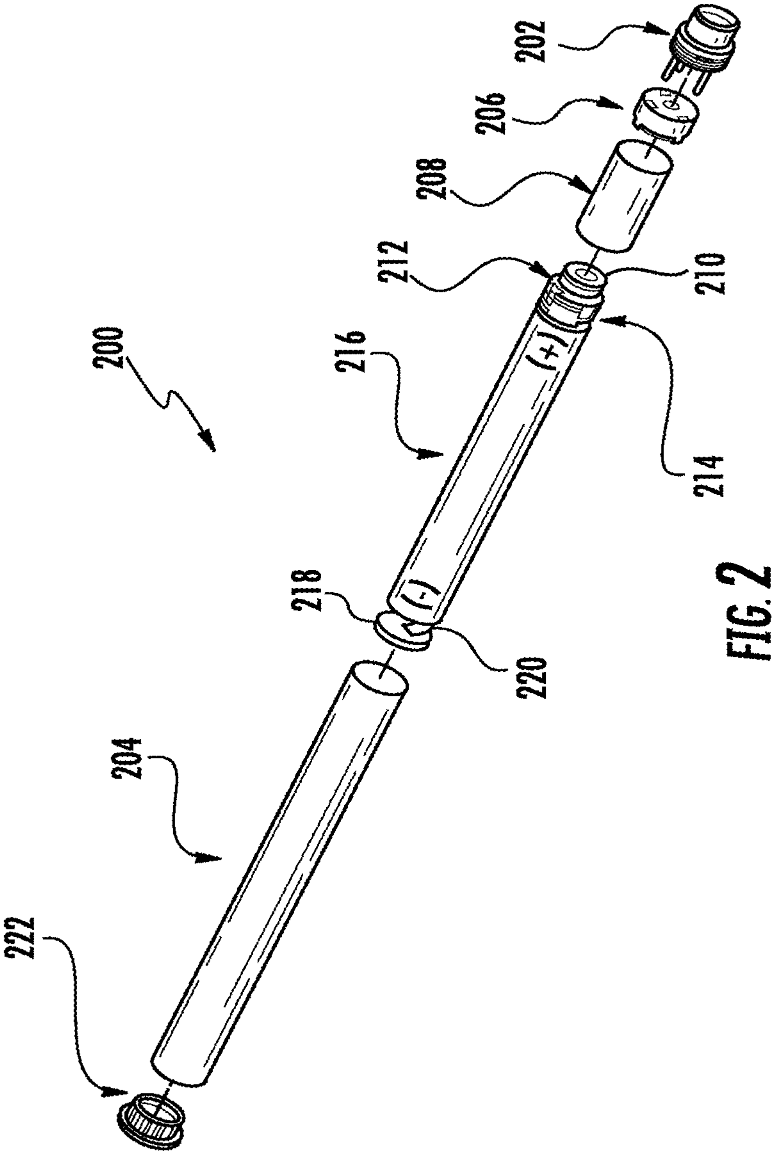
Figure 3:
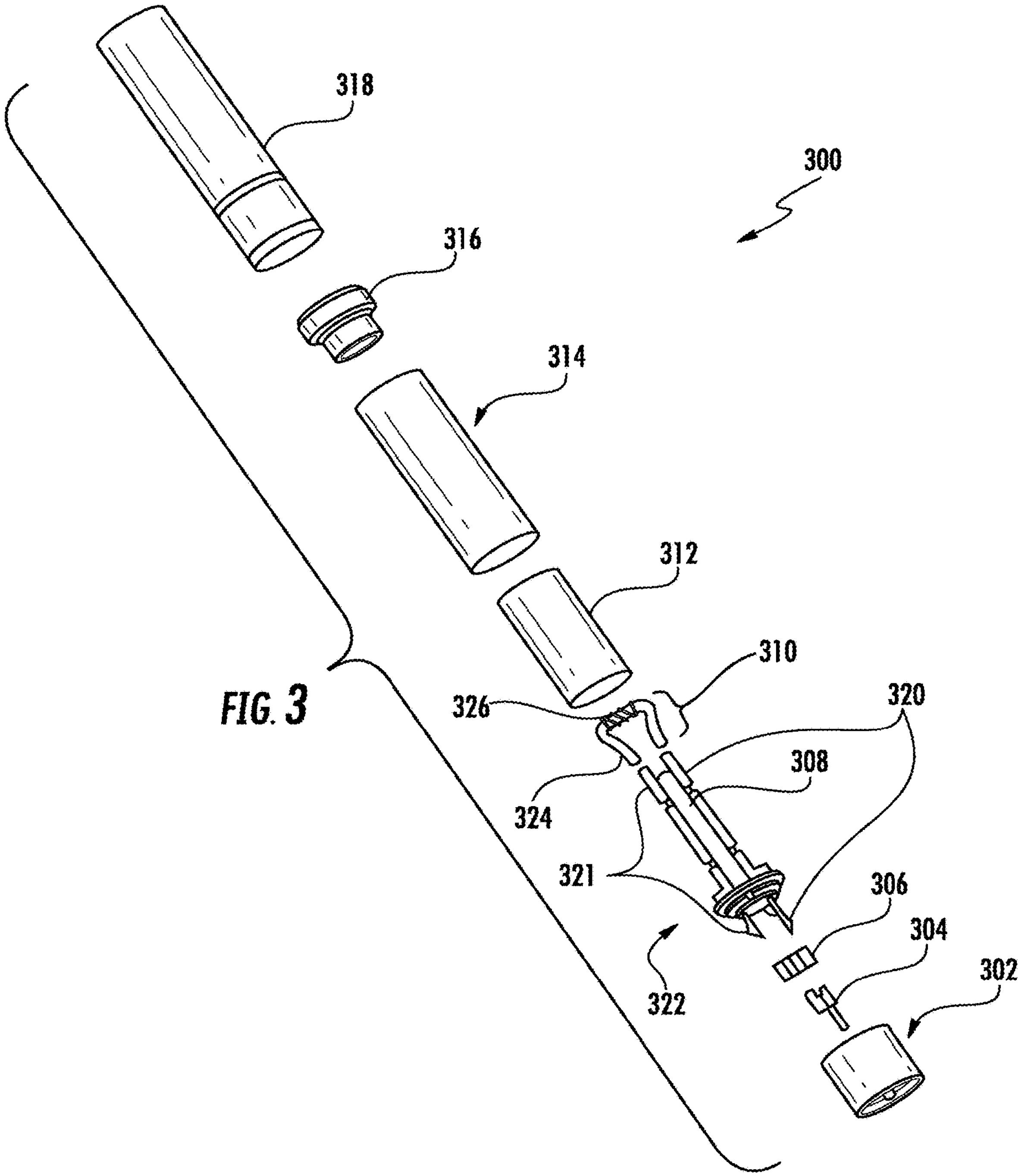
Figure 4:
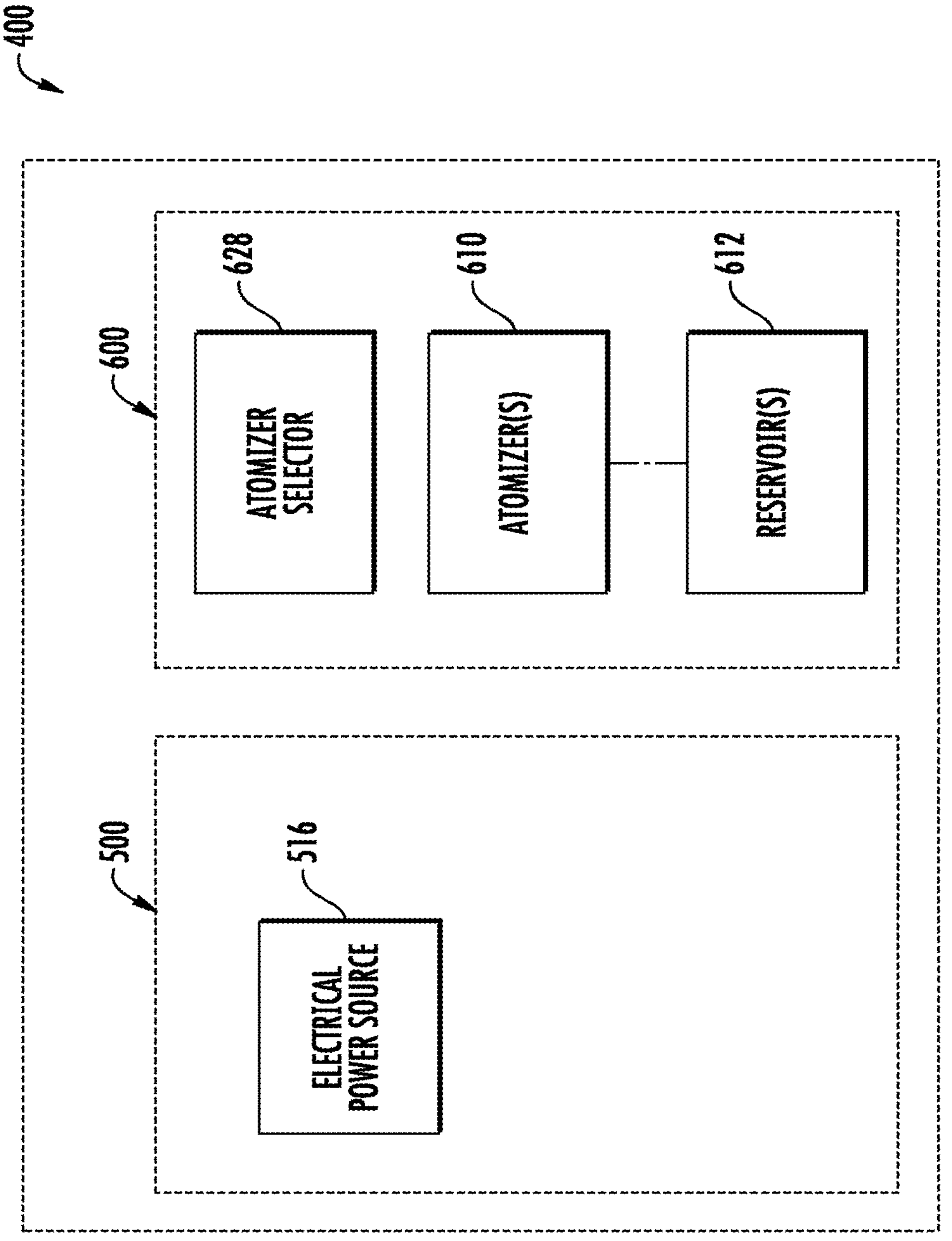
Figure 5:
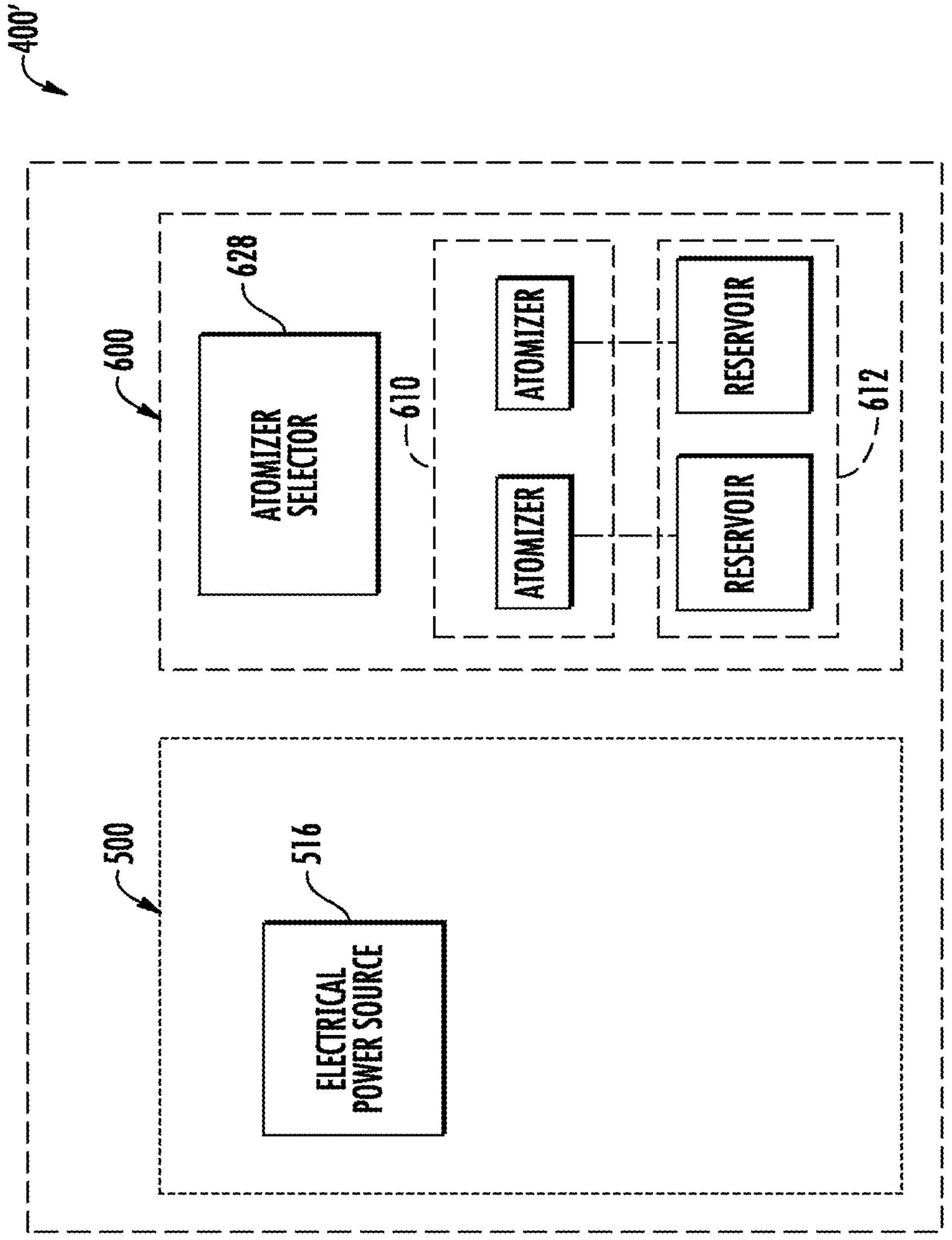
Figure 6:
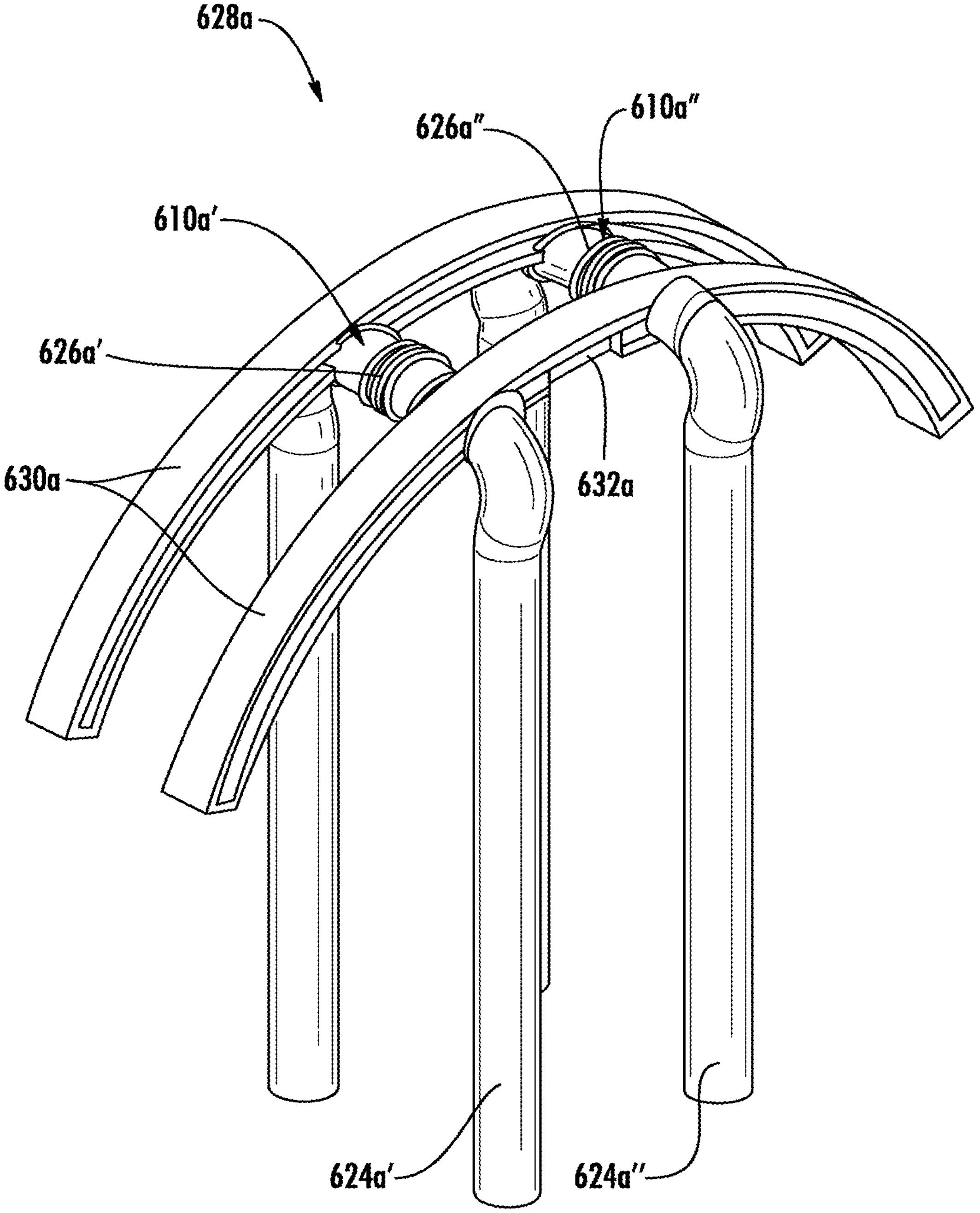
Figure 7:
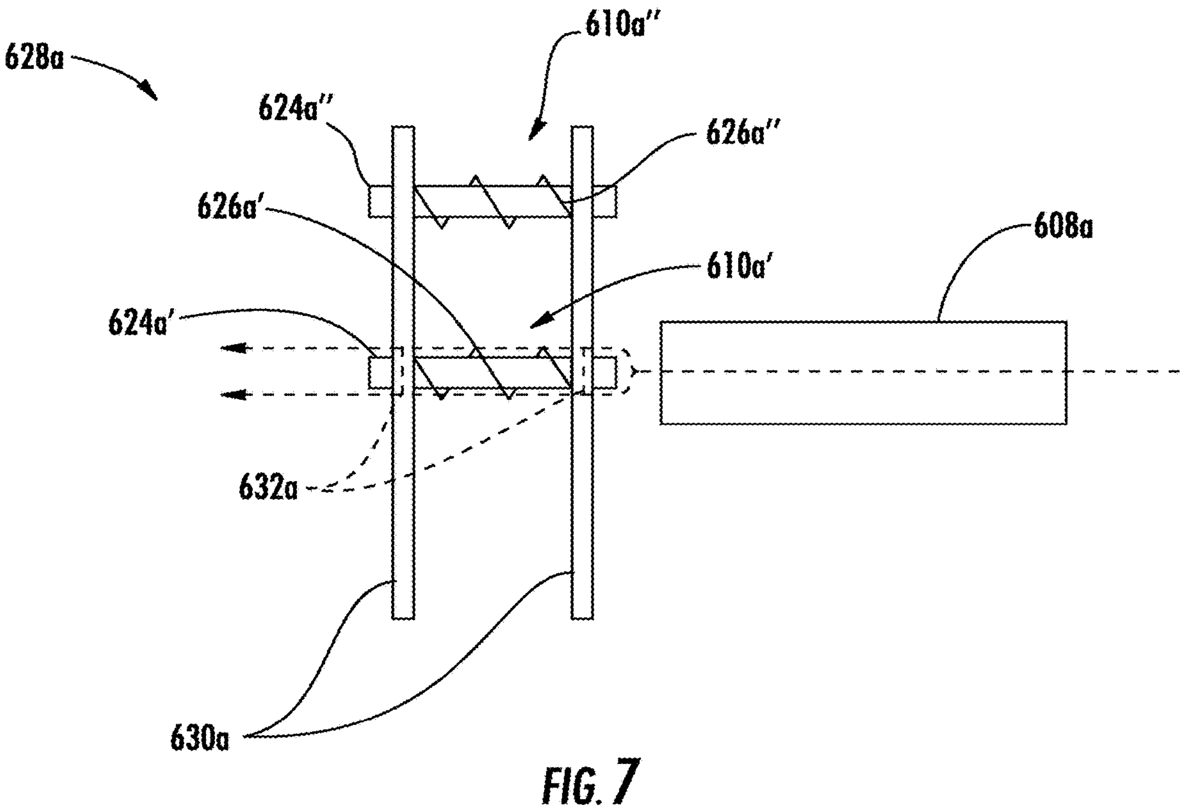
Figure 8:
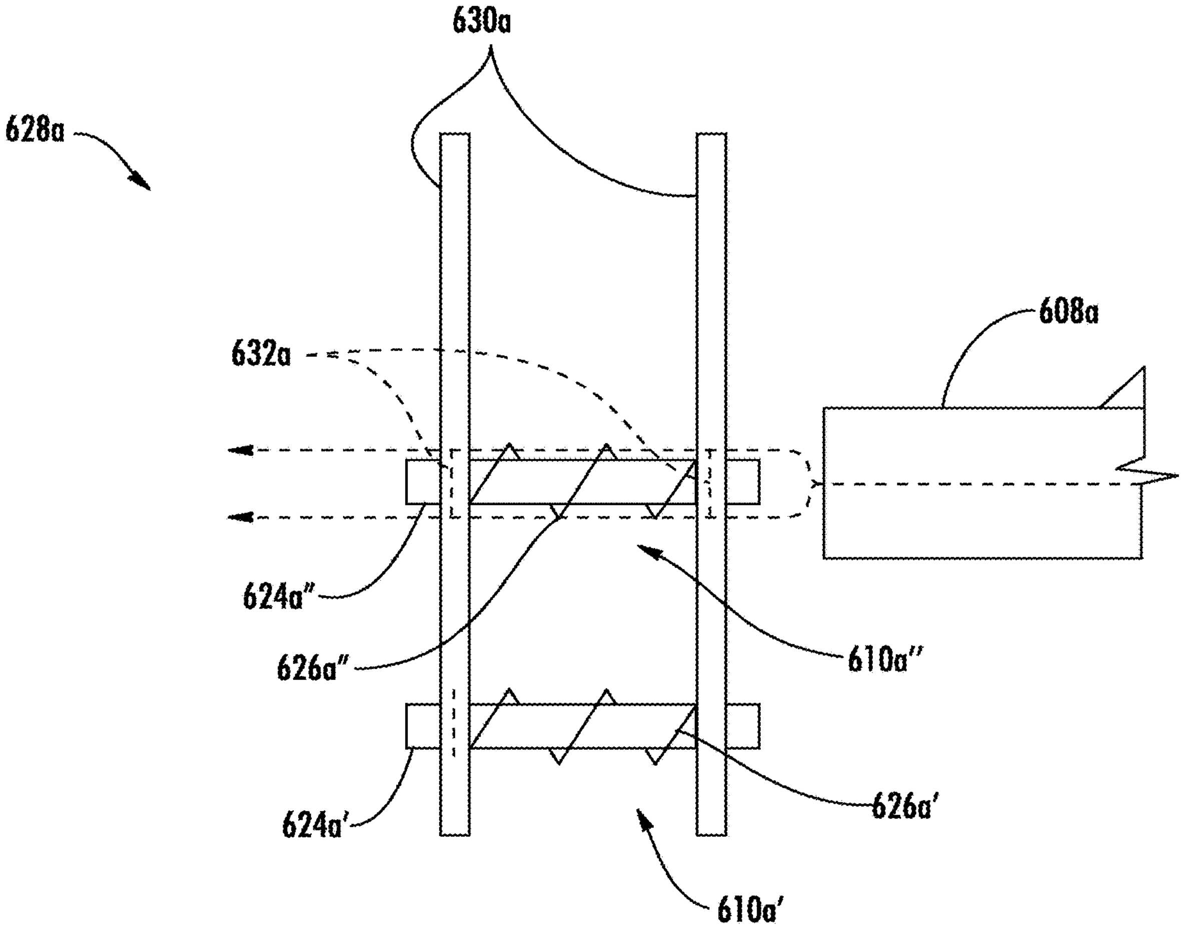
Figure 9:
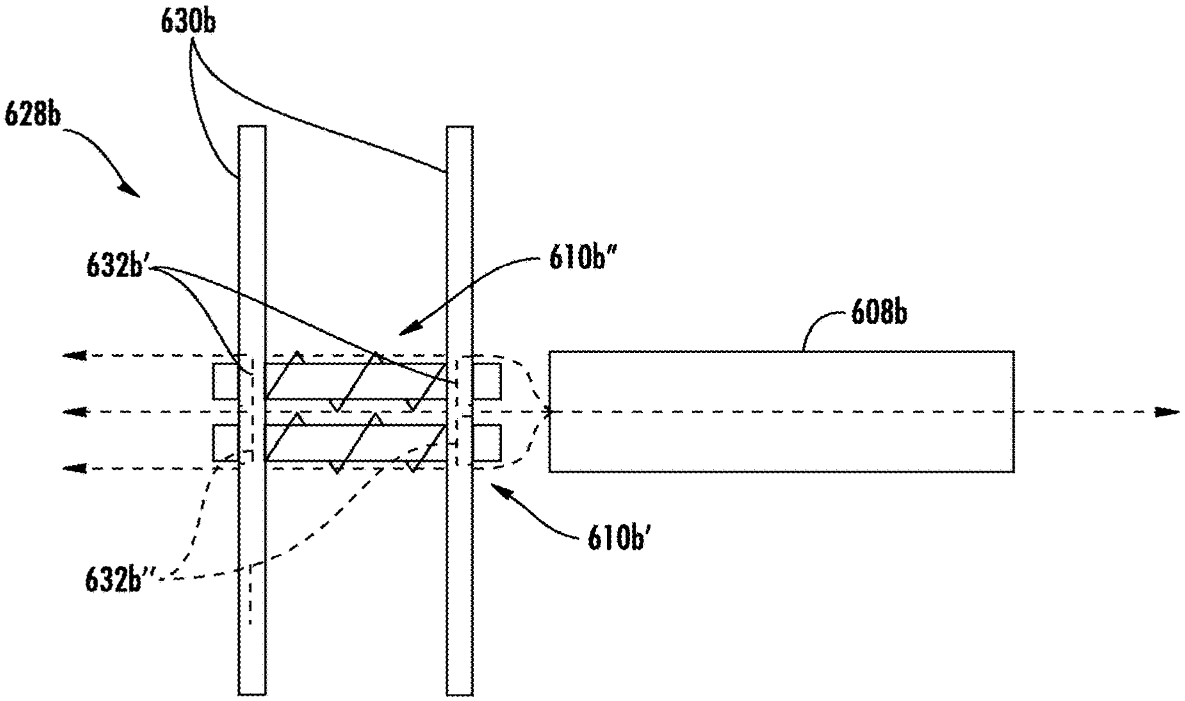
Figure 10:
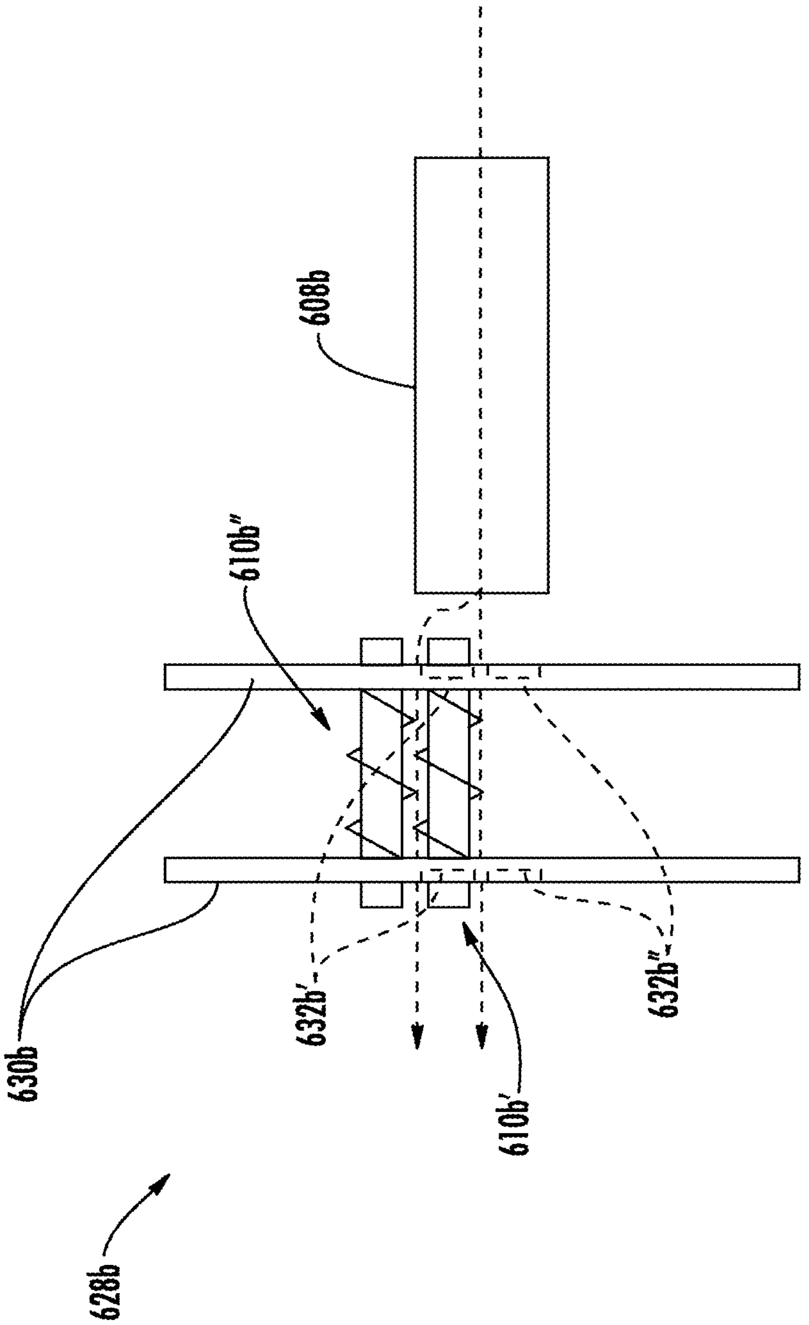
Figure 11:
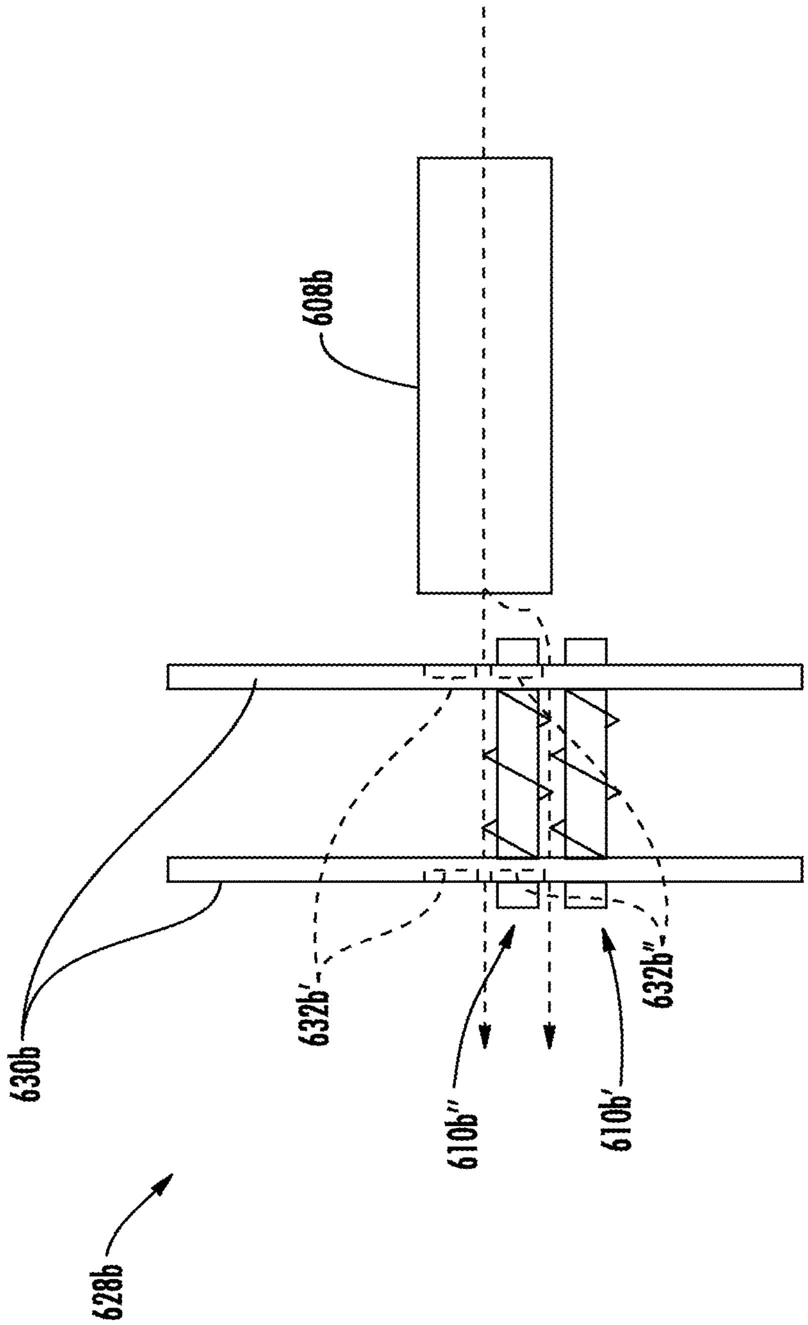
Figure 12:
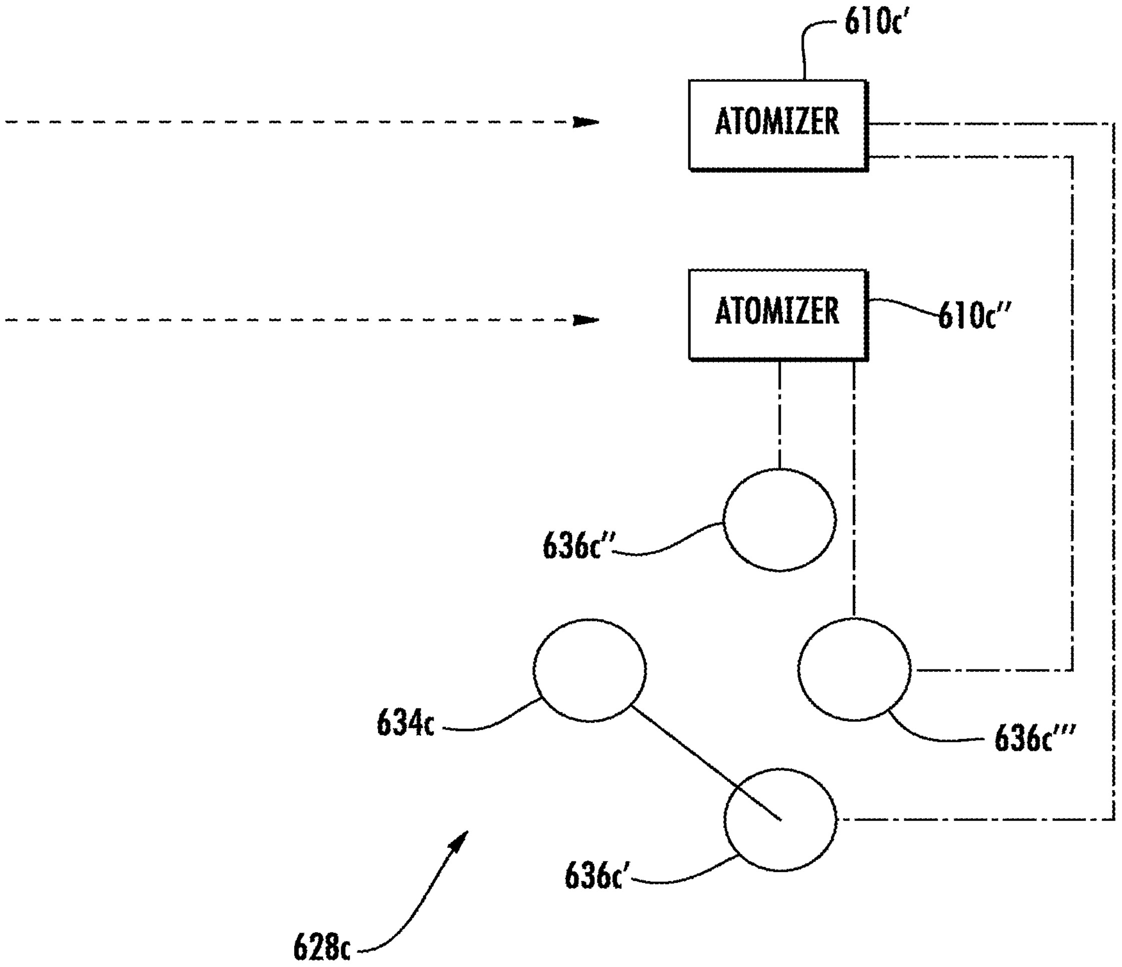
Figure 13:
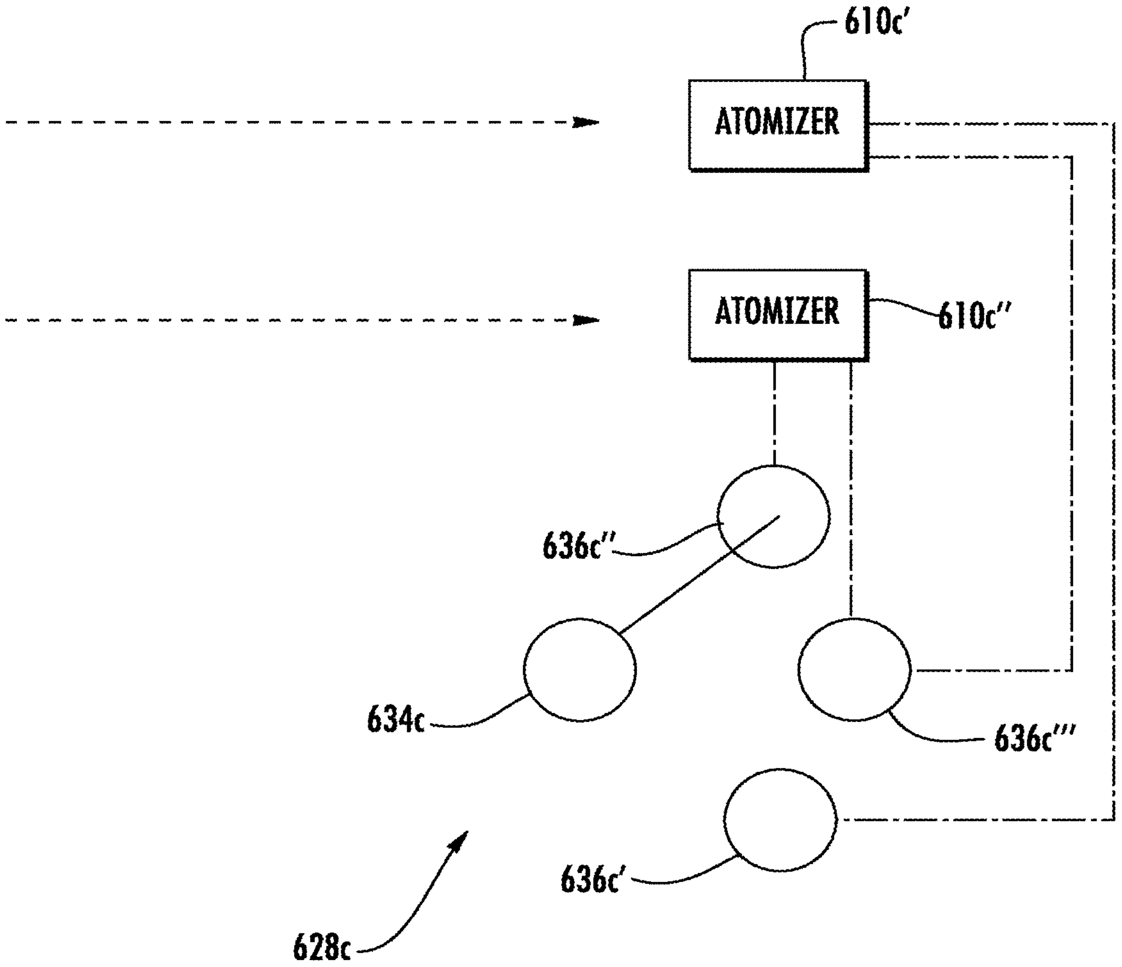
Figure 14:
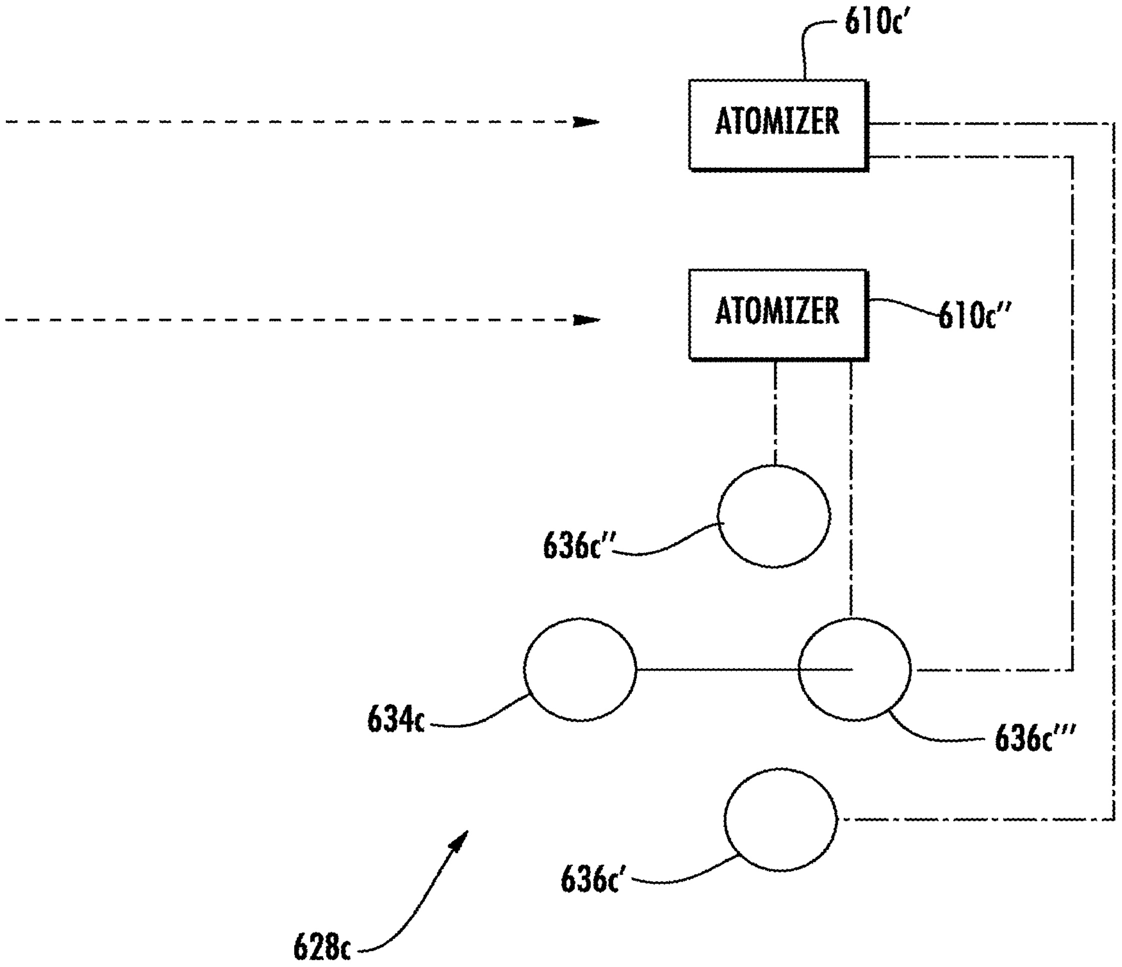
Figure 15:
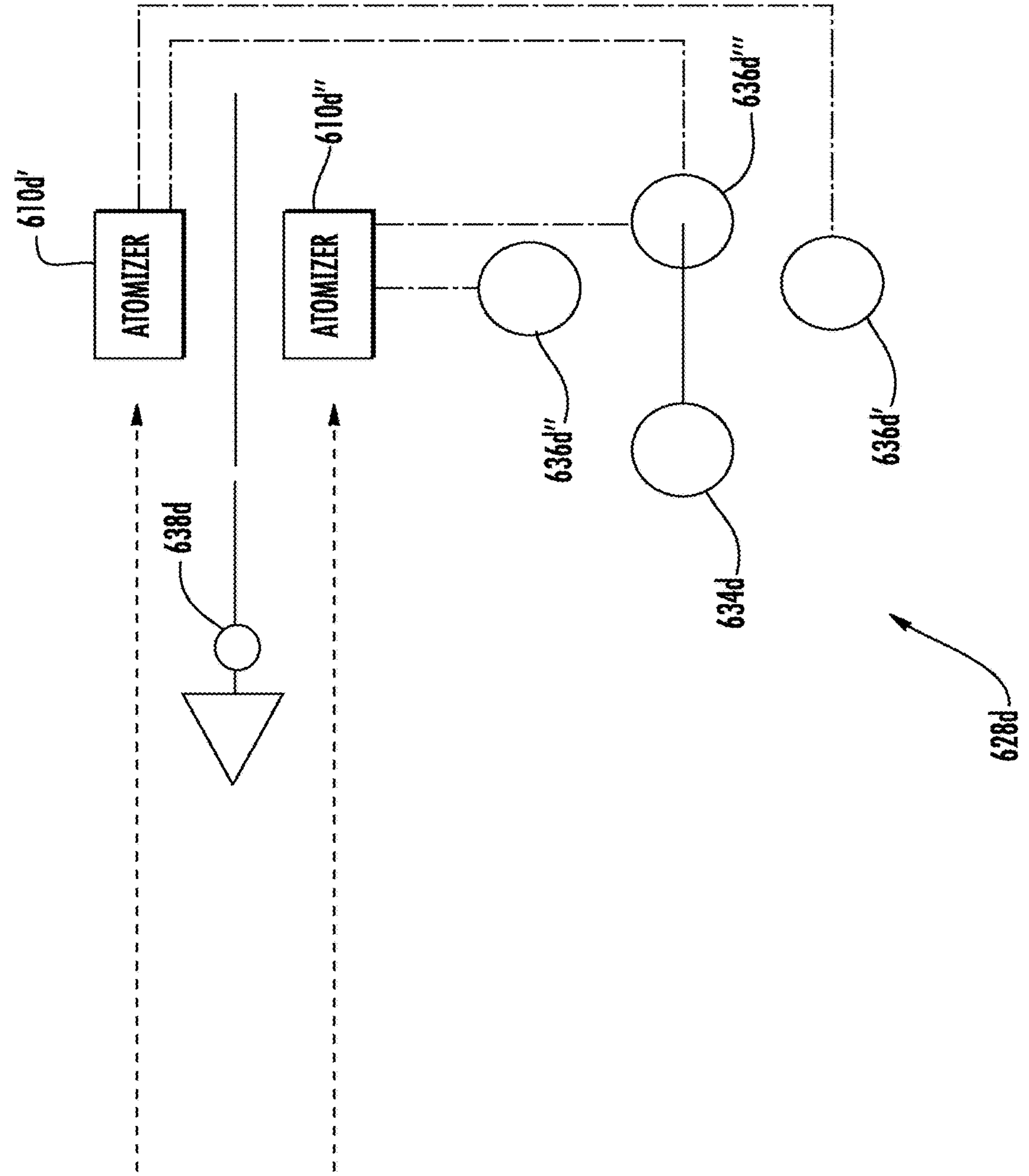
Figure 16:
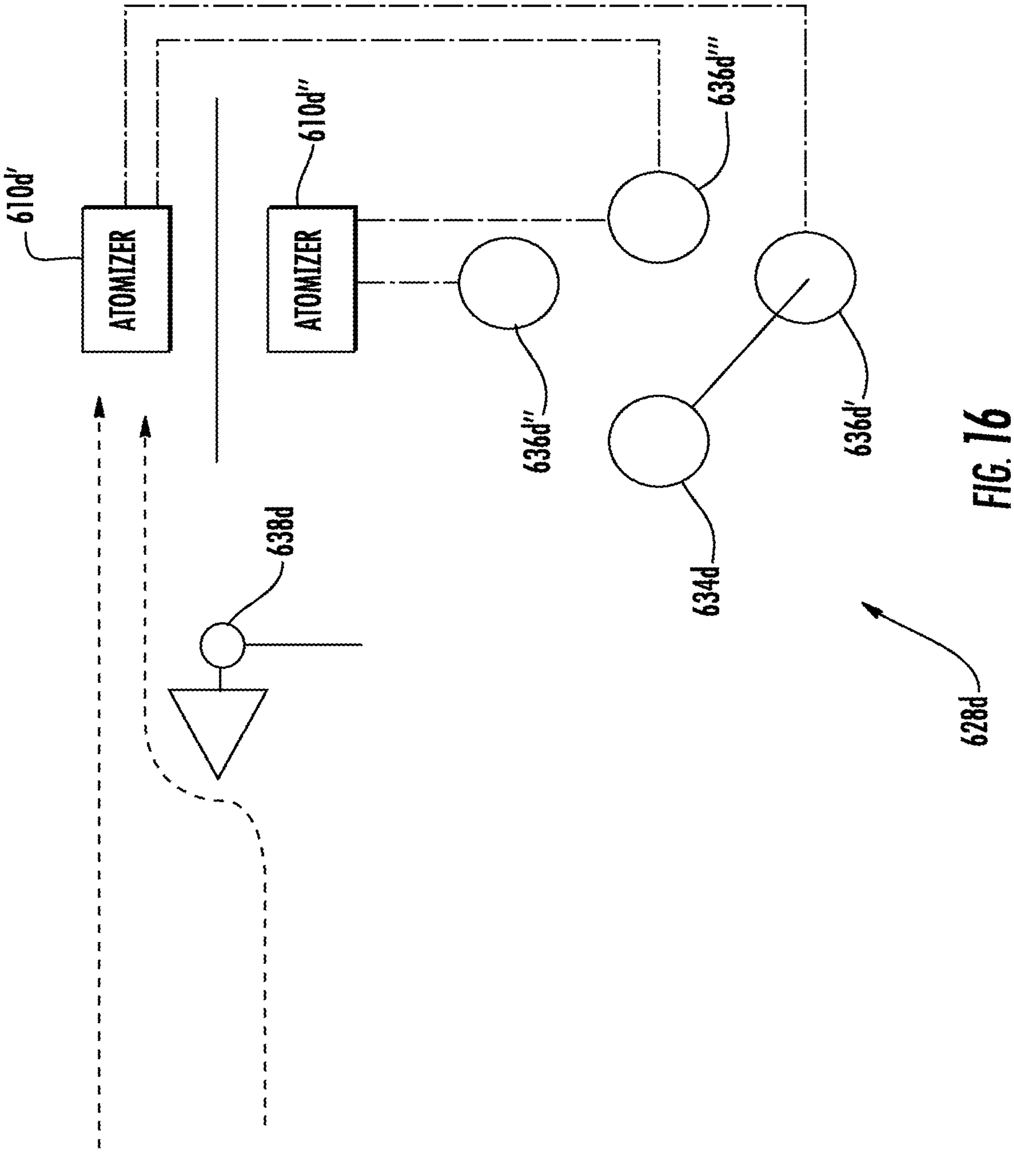
Figure 17:
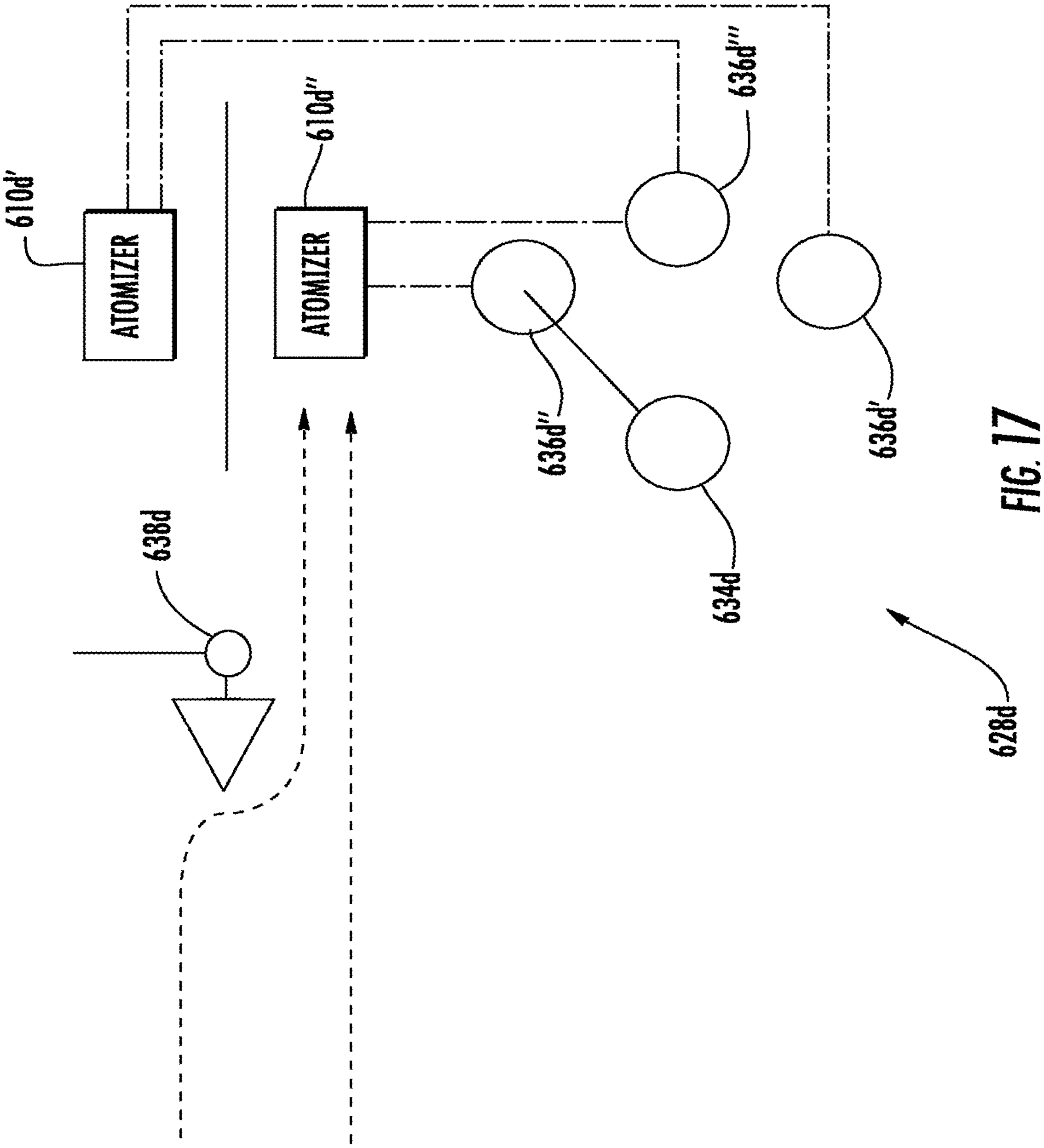
Figure 18:
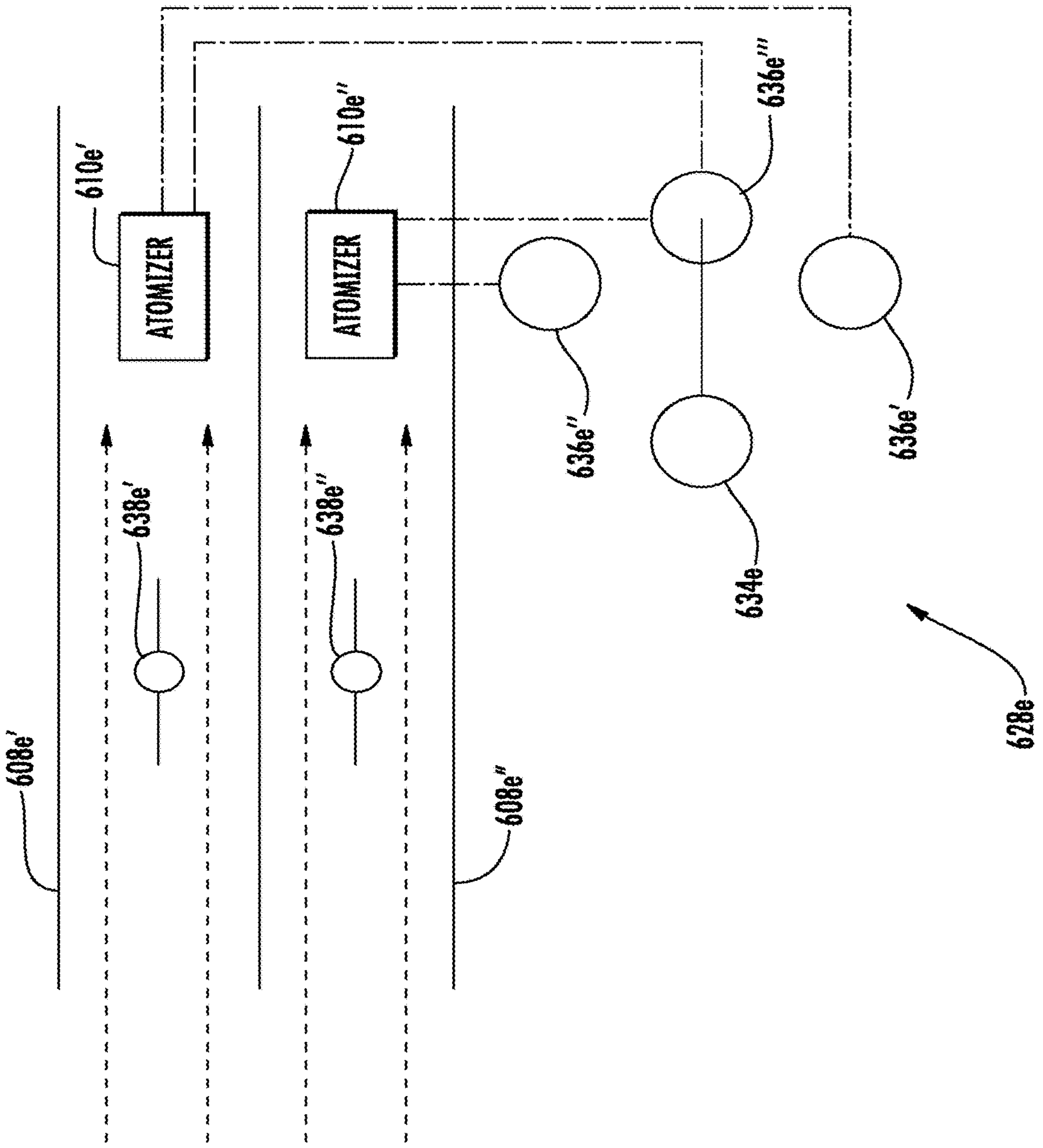
Figure 19:
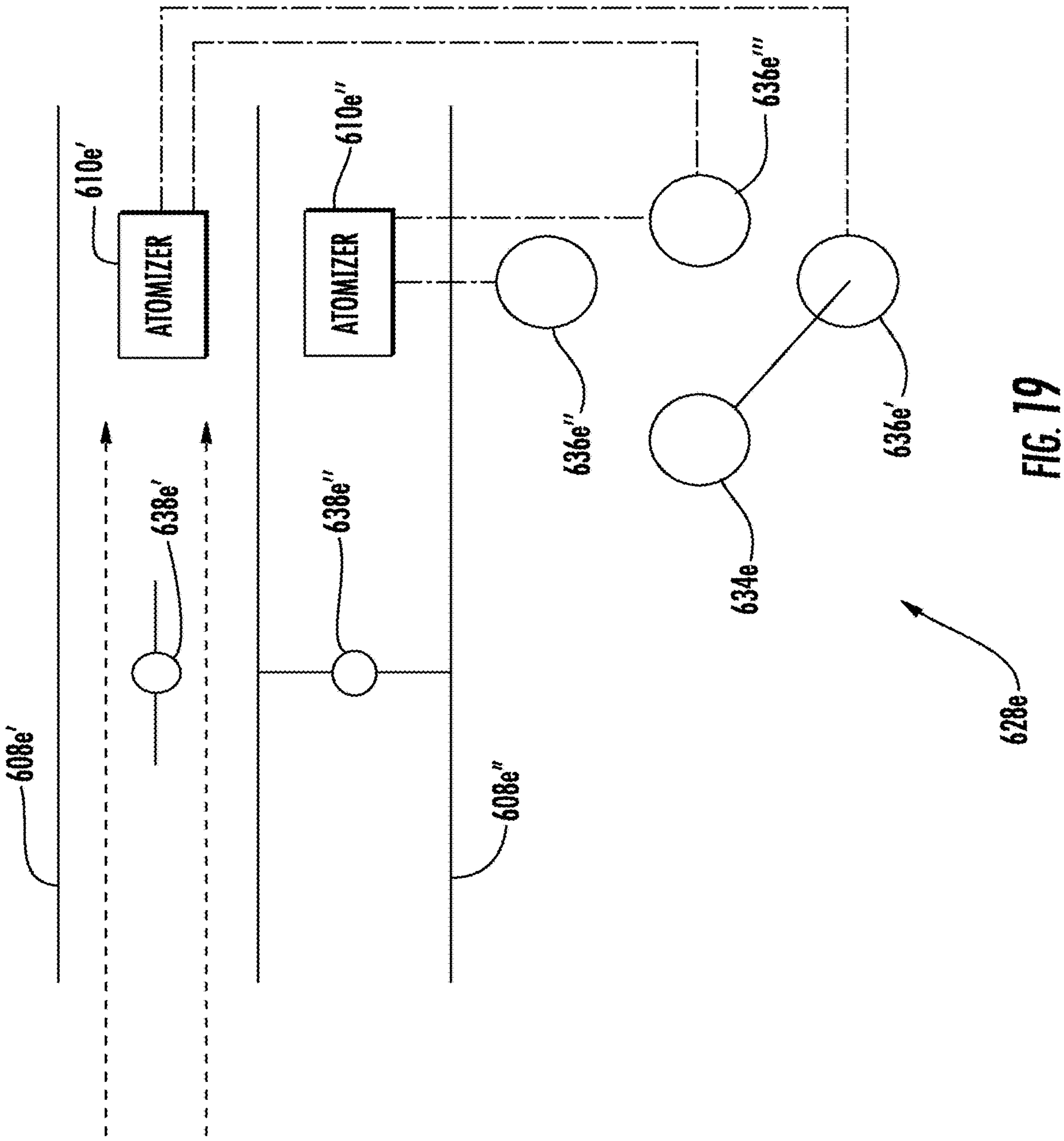
Figure 20:
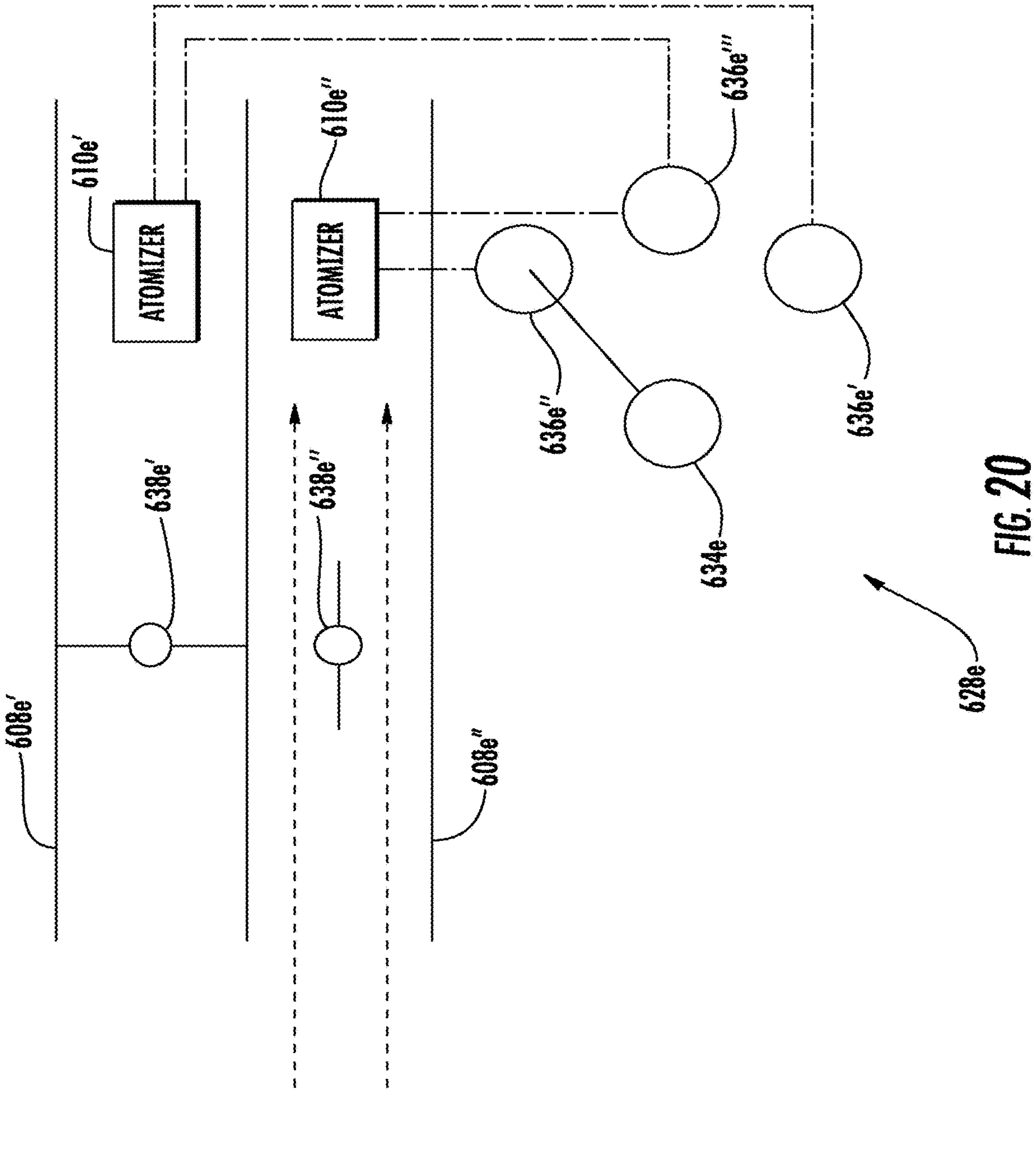
Figure 21:
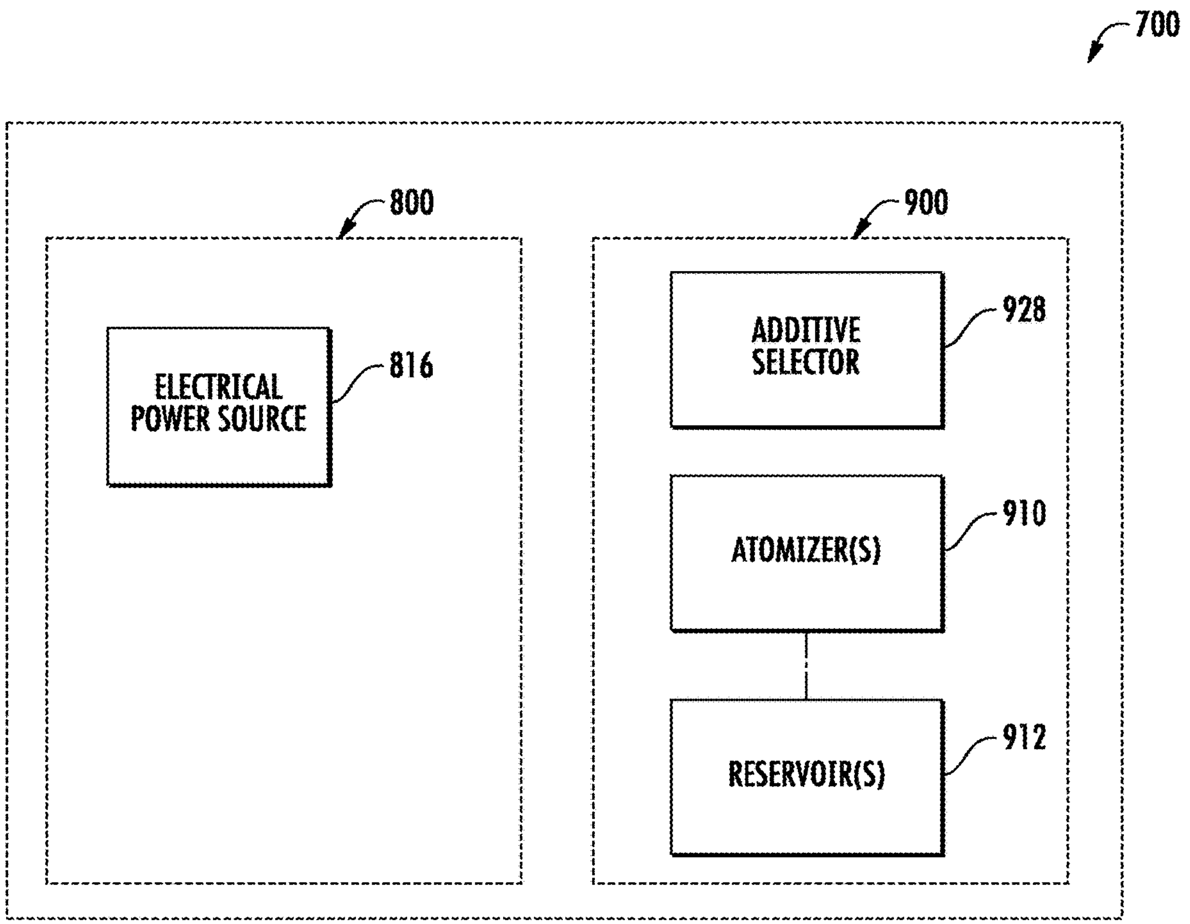
Figure 22:
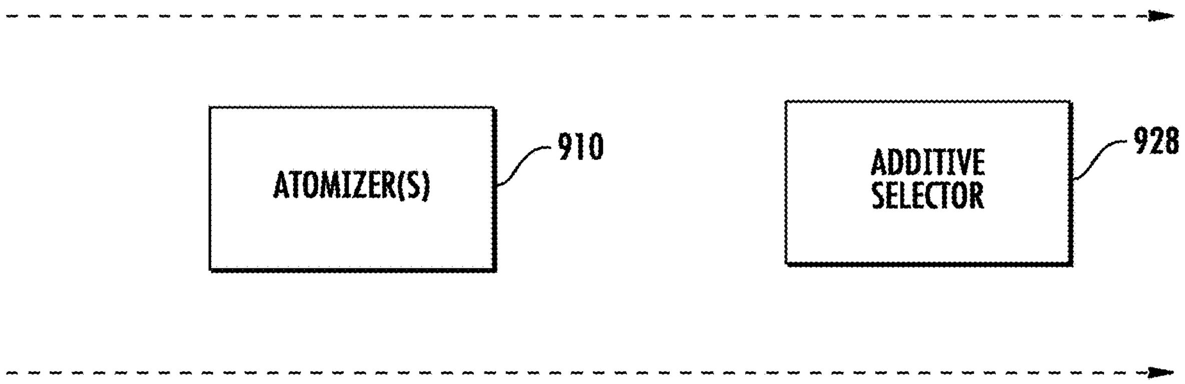
Figure 23:
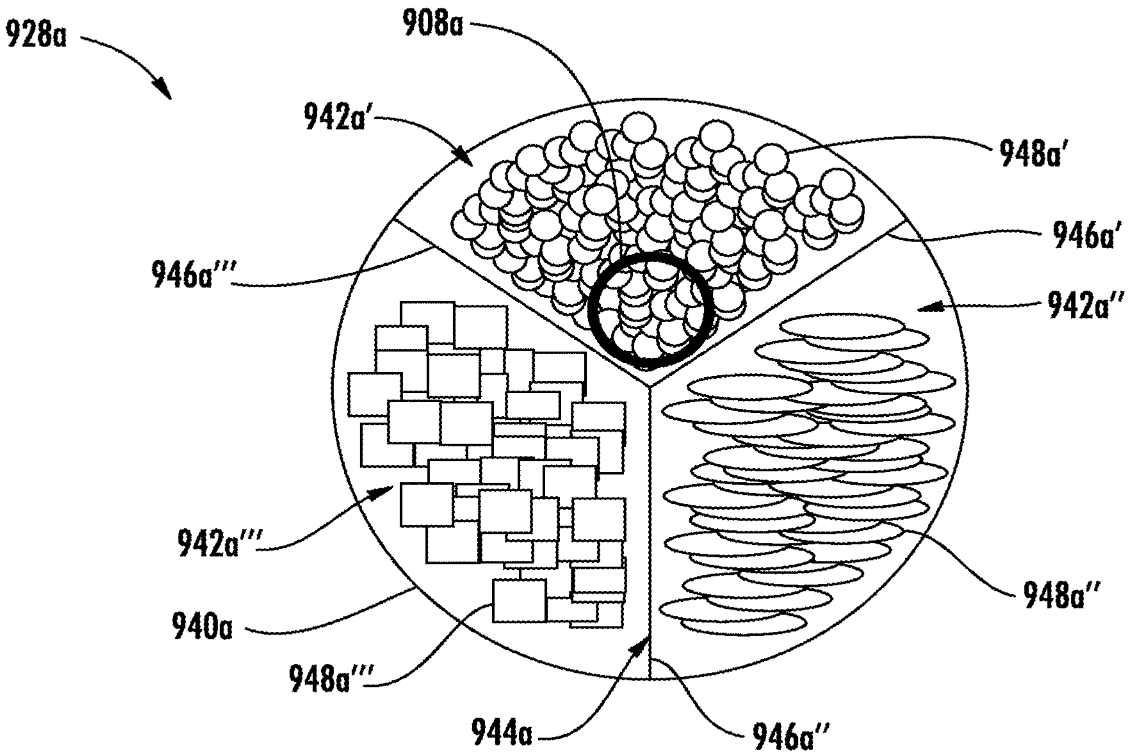
Figure 24:
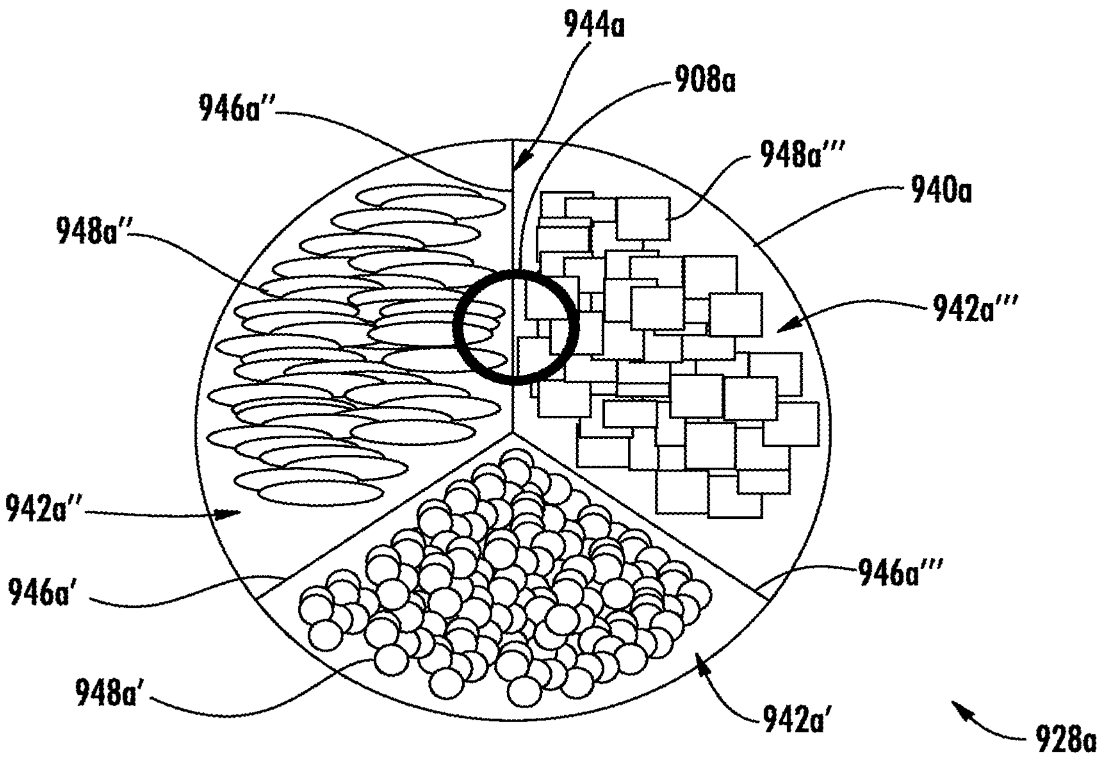
Figure 25:
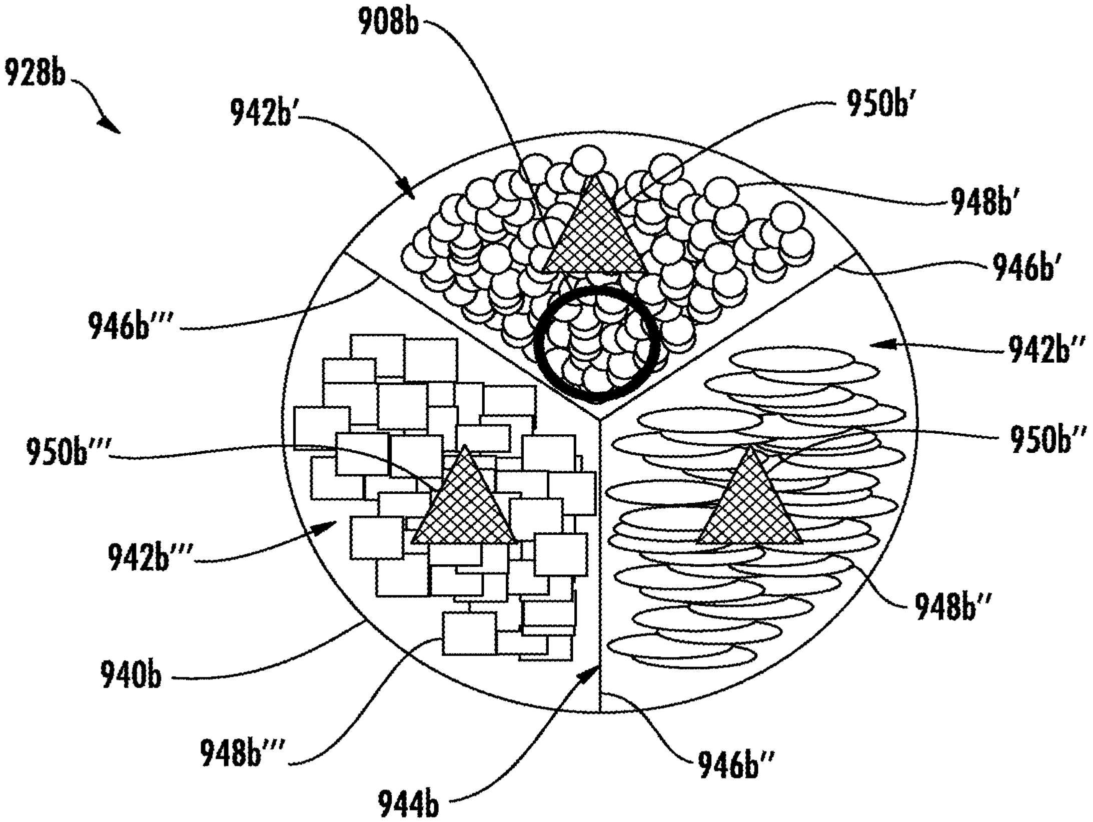
Figure 26:
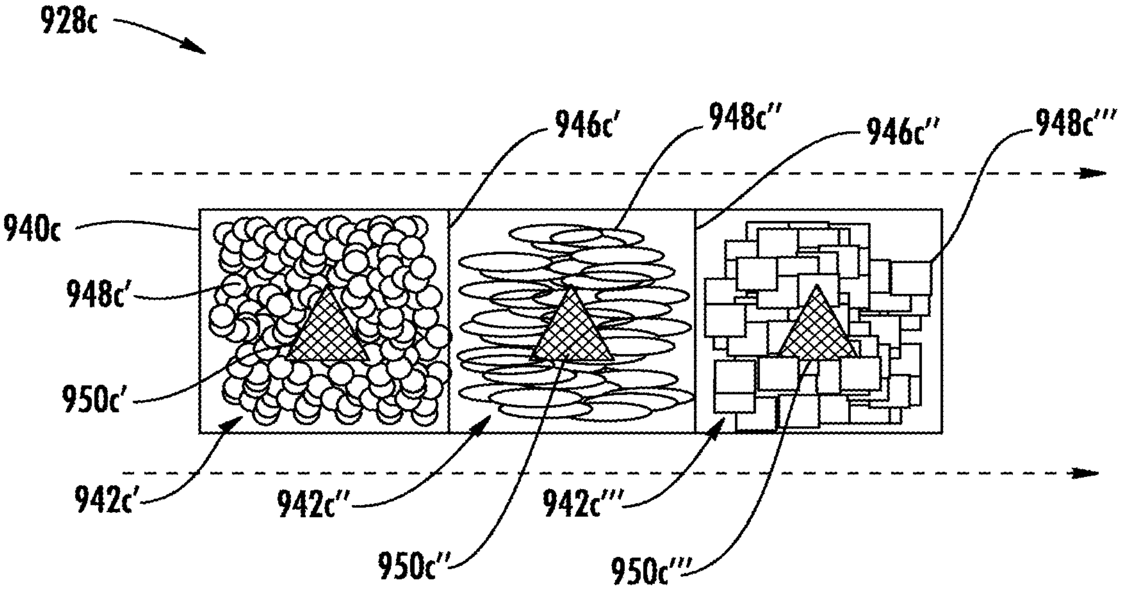
Figure 27:
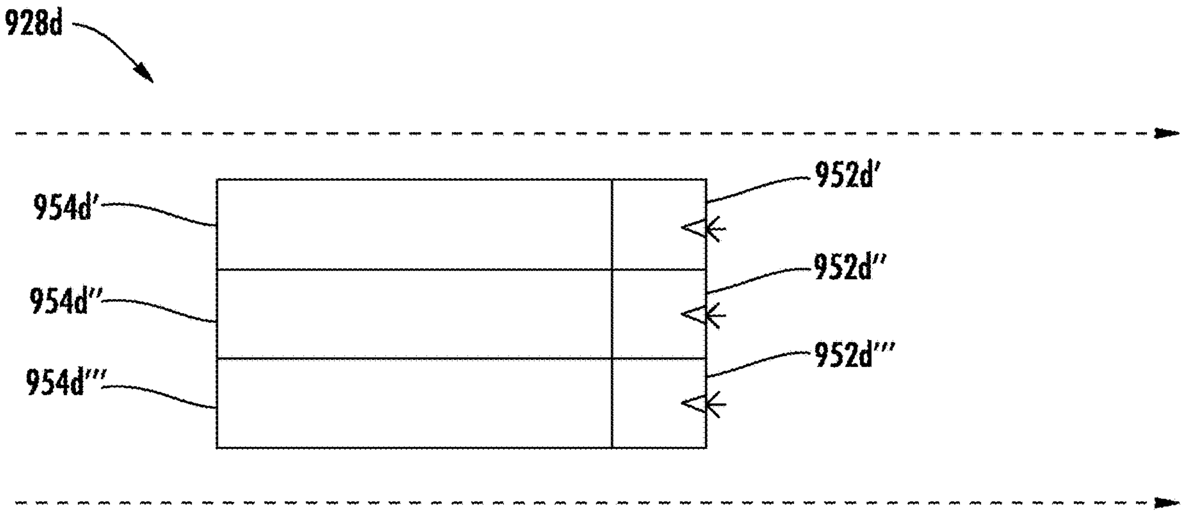
Figure 28:
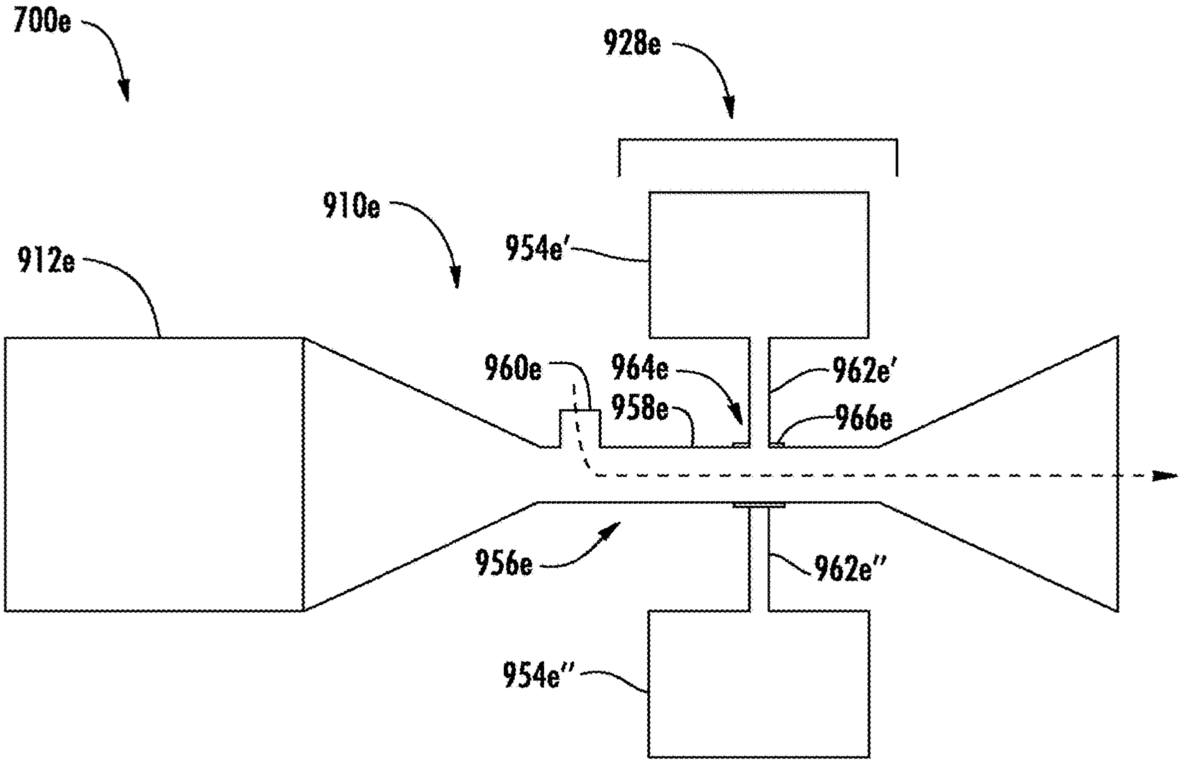
Figure 29:
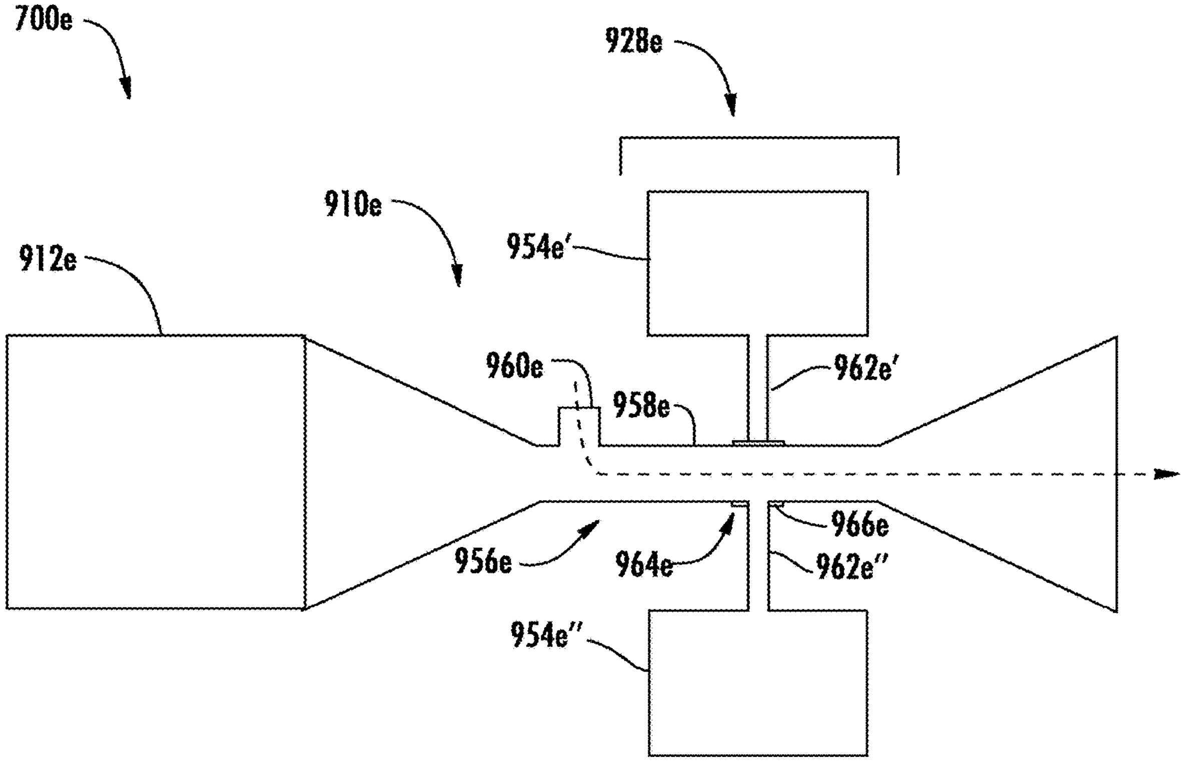
Figure 30:
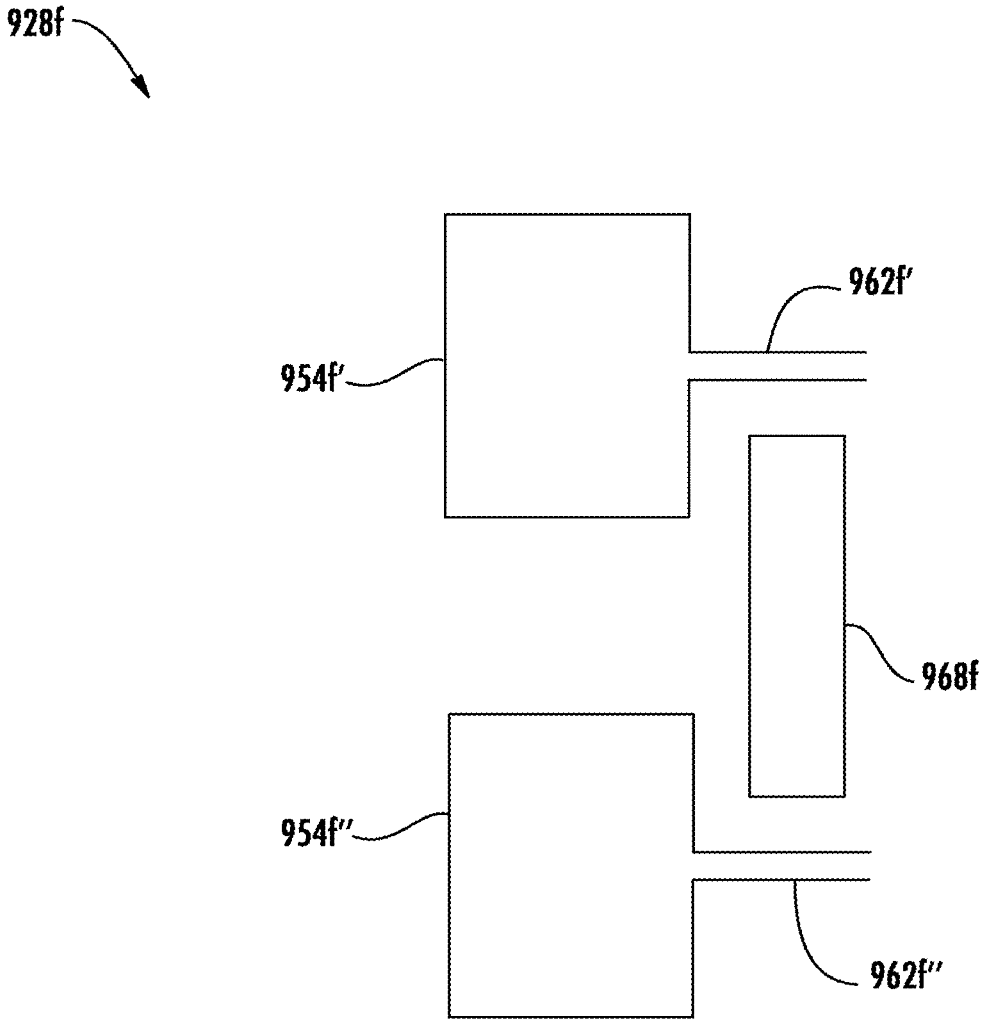
Figure 31:
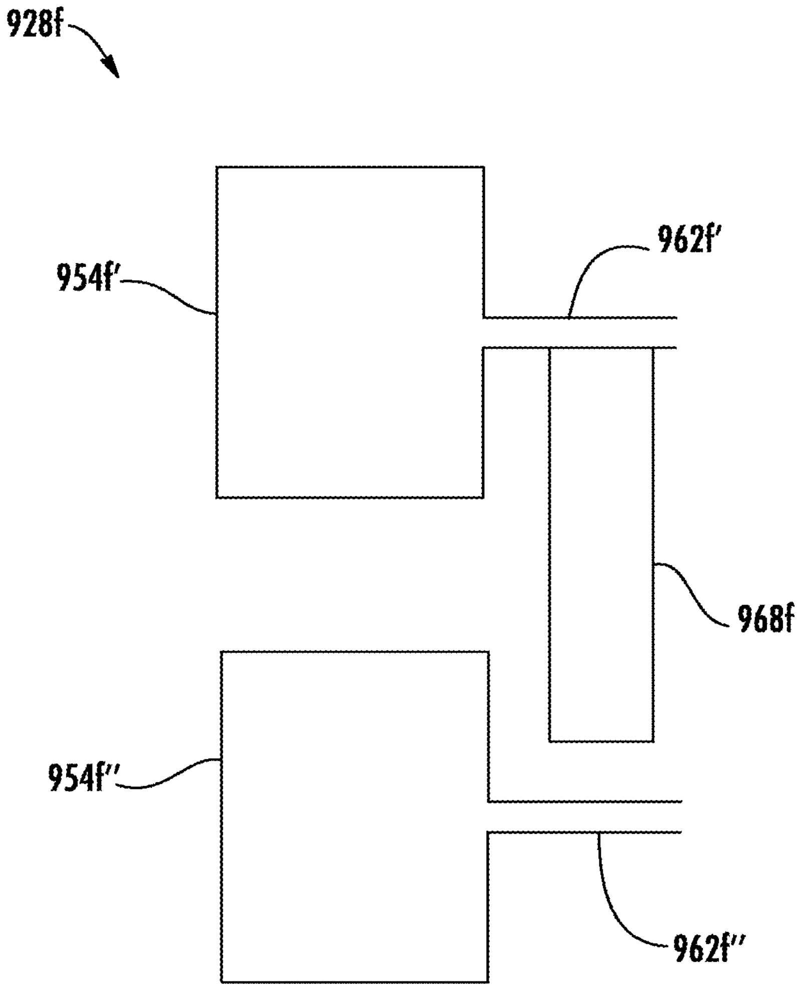
Figure 32:
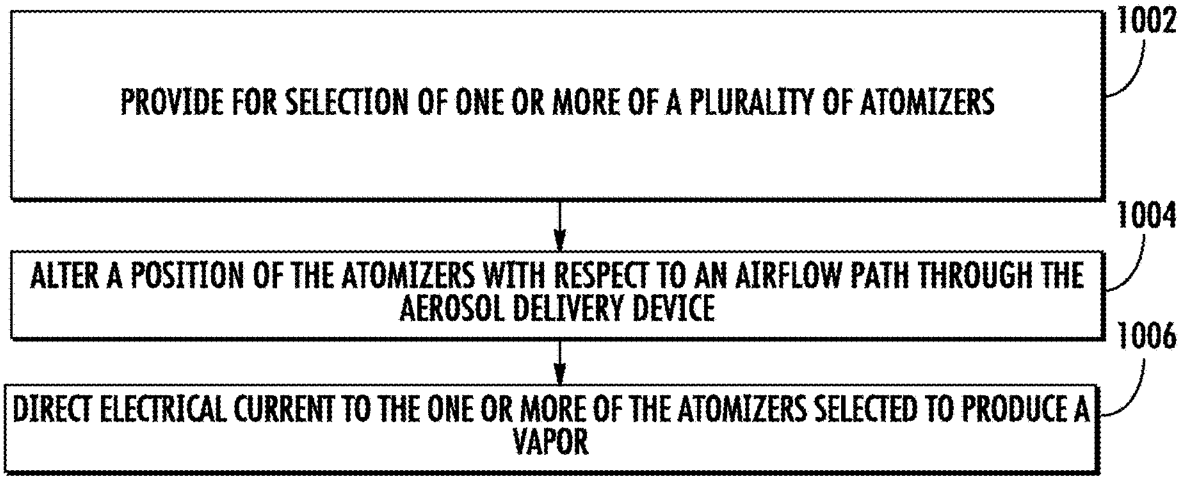
Figure 33:
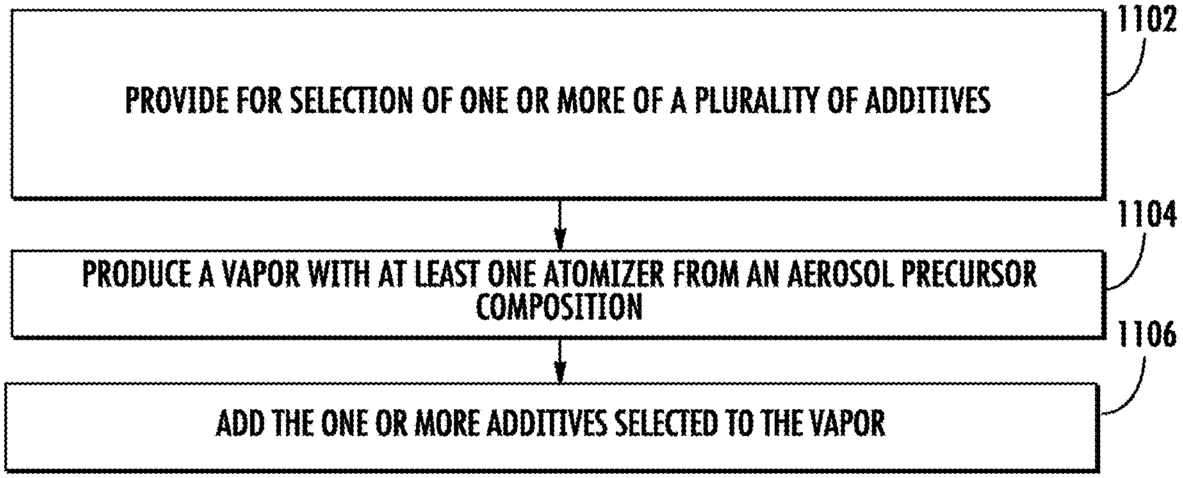

Having thus described the disclosure in the foregoing general terms, reference will now be made to the accompanying drawings, which are not necessarily drawn to scale, and wherein:

FIG. 1 illustrates an aerosol delivery device comprising a cartridge and a control body in an assembled configuration according to an example embodiment of the present disclosure;

FIG. 2 illustrates the control body of FIG. 1 in an exploded configuration according to an example embodiment of the present disclosure;

FIG. 3 illustrates the cartridge of FIG. 1 in an exploded configuration according to an example embodiment of the present disclosure;

FIG. 4 schematically illustrates an aerosol delivery device including an atomizer selector, one or more atomizers, and one or more reservoirs according to an example embodiment of the present disclosure;

FIG. 5 schematically illustrates an embodiment of the aerosol delivery device of FIG. 4 comprising a plurality of atomizers and a plurality of reservoirs;

FIG. 6 illustrates a perspective view of an atomizer selector including a plurality of guide tracks and first and second atomizers in an electrically disconnected configuration according to an example embodiment of the present disclosure;

FIG. 7 illustrates a top view of the atomizer selector of FIG. 6 wherein the first atomizer is electrically connected;

FIG. 8 illustrates a top view of the atomizer selector of FIG. 6 wherein the second atomizer is electrically connected;

FIG. 9 illustrates a top view of an atomizer selector including a plurality of guide tracks and first and second atomizers each in an electrically connected configuration according to an example embodiment of the present disclosure;

FIG. 10 illustrates a top view of the atomizer selector of FIG. 9 wherein only the first atomizer is electrically connected;

FIG. 11 illustrates a top view of the atomizer selector of FIG. 9 wherein only the second atomizer is electrically connected;

FIG. 12 schematically illustrates an atomizer selector including a switch electrically connected to a first atomizer according to an example embodiment of the present disclosure;

FIG. 13 schematically illustrates the atomizer selector of FIG. 12 wherein the switch is electrically connected to a second atomizer according to an example embodiment of the present disclosure;

FIG. 14 schematically illustrates the atomizer selector of FIG. 14 wherein the switch is electrically connected to the first and second atomizers according to an example embodiment of the present disclosure;

FIG. 15 schematically illustrates an atomizer selector including a switch electrically connected to first and second atomizers and a valve directing airflow to the first and second atomizers according to an example embodiment of the present disclosure;

FIG. 16 schematically illustrates the atomizer selector of FIG. 15 wherein the switch is electrically coupled to the first atomizer and the valve directs airflow to the first atomizer;

FIG. 17 schematically illustrates the atomizer selector of FIG. 15 wherein the switch is electrically coupled to the second atomizer and the valve directs airflow to the second atomizer;

FIG. 18 schematically illustrates an atomizer selector including a switch electrically connected to first and second atomizers and first and second valves in first and second flow directors to allow airflow to the first and second atomizers according to an example embodiment of the present disclosure;

FIG. 19 schematically illustrates the atomizer selector of FIG. 18 wherein the switch is electrically connected to the first atomizer, the first valve is open, and the second valve is closed;

FIG. 20 schematically illustrates the atomizer selector of FIG. 18 wherein the switch is electrically connected to the second atomizer, the second valve is open, and the first valve is closed;

FIG. 21 schematically illustrates an aerosol delivery device including an additive selector, one or more atomizers, and one or more reservoirs according to an example embodiment of the present disclosure;

FIG. 22 schematically illustrates a configuration of the one or more atomizers and the additive selector of the aerosol delivery device of FIG. 21 relative to an airflow therethrough;

FIG. 23 illustrates a top view of a flow director and an additive selector including a bed of solids, wherein the flow director is aligned with a first compartment according to an example embodiment of the present disclosure;

FIG. 24 illustrates a top view of the flow director and the additive selector of FIG. 23, wherein the flow director is aligned with second and third compartments according to an example embodiment of the present disclosure;

FIG. 25 illustrates a top view of a flow director and an additive selector including a bed of solids including a plurality of additive heating elements, wherein the compartments are arranged perpendicular to the airflow therethrough according to an example embodiment of the present disclosure;

FIG. 26 illustrates a side view of an additive selector including a bed of solids including a plurality of additive heating elements, wherein the compartments are arranged in-line with the airflow therethrough according to an example embodiment of the present disclosure;

FIG. 27 illustrates a side view of an additive selector including a plurality of bubble jet heads according to an example embodiment of the present disclosure;

FIG. 28 illustrates a side view of an aerosol delivery device including a Venturi nozzle wherein a first channel of an additive selector is in fluid communication with the Venturi nozzle according to an example embodiment of the present disclosure;

FIG. 29 illustrates a side view of the aerosol delivery device of FIG. 28 wherein a second channel of an additive selector is in fluid communication with the Venturi nozzle according to an example embodiment of the present disclosure;

FIG. 30 illustrates a side view of an additive selector including a crystal oscillator in a decoupled configuration according to an example embodiment of the present disclosure;

FIG. 31 illustrates a side view of the additive selector of FIG. 30 wherein the crystal oscillator is in contact with a first channel according to an example embodiment of the present disclosure;

FIG. 32 schematically illustrates a method for vapor production with an aerosol delivery device including altering a position of atomizers with respect to an airflow path through the aerosol delivery device according to an example embodiment of the present disclosure; and FIG. 33 schematically illustrates a method for vapor production with an aerosol delivery device including providing for selection of one or more of a plurality of additives according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

The present disclosure provides descriptions of aerosol delivery devices. The aerosol delivery devices may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device most preferably yields vapors (including vapors within aerosols that can be considered to be visible aerosols that might be considered to be described as smoke-like) resulting from volatilization or vaporization of certain components of the article or device, although in other embodiments the aerosol may not be visible. In highly preferred embodiments, aerosol delivery devices may incorporate tobacco and/or components derived from tobacco. As such, the aerosol delivery device can be characterized as an electronic smoking article such as an electronic cigarette or "e-cigarette."

While the systems are generally described herein in terms of embodiments associated with aerosol delivery devices such as so-called "e-cigarettes," it should be understood that the mechanisms, components, features, and methods may be embodied in many different forms and associated with a variety of articles. For example, the description provided herein may be employed in conjunction with embodiments of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of embodiments relating to aerosol delivery devices by way of example only, and may be embodied and used in various other products and methods.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer shell or body. The overall design of the outer shell or body can vary, and the format or configuration of the outer body that can define the overall size and shape of the aerosol delivery device can vary. Typically, an elongated body resembling the shape of a cigarette or cigar can be a formed from a single, unitary shell; or the elongated body can be formed of two or more separable pieces. For example, an aerosol delivery device can comprise an elongated shell or body that can be substantially tubular in shape and, as such, resemble the shape of a conventional cigarette or cigar.

However, various other shapes and configurations may be employed in other embodiments (e.g., rectangular or fob-shaped).

In one embodiment, all of the components of the aerosol delivery device are contained within one outer body or shell. Alternatively, an aerosol delivery device can comprise two or more shells that are joined and are separable. For example, an aerosol delivery device can possess at one end a control body comprising a shell containing one or more reusable components (e.g., a rechargeable battery and various electronics for controlling the operation of that article), and at the other end and removably attached thereto a shell containing a disposable portion (e.g., a disposable flavor-containing cartridge). More specific formats, configurations and arrangements of components within the single shell type of unit or within a multi-piece separable shell type of unit will be evident in light of the further disclosure provided herein. Additionally, various aerosol delivery device designs and component arrangements can be appreciated upon consideration of the commercially available electronic aerosol delivery devices.

Aerosol delivery devices of the present disclosure most preferably comprise some combination of a power source (i.e., an electrical power source), at least one control component (e.g., means for actuating, controlling, regulating and/or ceasing power for heat generation, such as by controlling electrical current flow from the power source to other components of the aerosol delivery device), a heater or heat generation component (e.g., an electrical resistance heating element or component commonly referred to as part of an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw).

Alignment of the components within the aerosol delivery device of the present disclosure can vary. In specific embodiments, the aerosol precursor composition can be located near an end of the aerosol delivery device which may be configured to be positioned proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device may incorporate a battery or other electrical power source (e.g., a capacitor) to provide current flow sufficient to provide various functionalities to the aerosol delivery device, such as powering of a heater, powering of control systems, powering of indicators, and the like. The power source can take on various embodiments. Preferably, the power source is able to deliver sufficient power to rapidly heat the heating element to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device can also be appreciated upon consideration of the commercially available electronic aerosol delivery devices. Examples of commercially available products, for which the components thereof, methods of operation thereof, materials included therein, and/or other attributes thereof may be included in the devices of the present disclosure have been marketed as ACCORD® by Philip Morris Incorporated; ALPHA™, JOYE 510™ and M4™ by InnoVapor LLC; CIRRUS™ and FLING™ by White Cloud Cigarettes; BLU™ by Lorillard Technologies, Inc.; COHITA™, COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™, PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; AVIGO, VUSE, VUSE CONNECT, VUSE FOB, VUSE HYBRID, ALTO, ALTO+, MODO, CIRO, FOX+FOG, AND SOLO+ by R. J. Reynolds Vapor Company; MISTIC MENTHOL by Mistic Ecigs; and VYPE by CN Creative Ltd. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; SOUTH BEACH SMOKE™.

Additional manufacturers, designers, and/or assignees of components and related technologies that may be employed in the aerosol delivery device of the present disclosure include Shenzhen Jieshibo Technology of Shenzhen, China; Shenzhen First Union Technology of Shenzhen City, China; Safe Cig of Los Angeles, CA; Janty Asia Company of the Philippines; Joyetech Changzhou Electronics of Shenzhen, China; SIS Resources; B2B International Holdings of Dover, DE; Evolv LLC of OH; Montrade of Bologna, Italy; Shenzhen Bauway Technology of Shenzhen, China; Global Vapor Trademarks Inc. of Pompano Beach, FL; Vapor Corp. of Fort Lauderdale, FL; Nemtra GMBH of Raschau-Markersbach, Germany, Perrigo L. Co. of Allegan, MI; Needs Co., Ltd.; Smokefree Innotec of Las Vegas, NV; McNeil A B of Helsingborg, Sweden; Chong Corp; Alexza Pharmaceuticals of Mountain View, CA; BLEC, LLC of Charlotte, NC; Gaitrend Sarl of Rohrbach-lès-Bitche, France; FeelLife Bioscience International of Shenzhen, China; Vishay Electronic BMGH of Selb, Germany; Shenzhen Smaco Technology Ltd. of Shenzhen, China; Vapor Systems International of Boca Raton, FL; Exonoid Medical Devices of Israel; Shenzhen Nowotech Electronic of Shenzhen, China; Minilogic Device Corporation of Hong Kong, China; Shenzhen Kontle Electronics of Shenzhen, China, and Fuma International, LLC of Medina, OH, 21st Century Smoke of Beloit, WI, and Kimree Holdings (HK) Co. Limited of Hong Kong, China.

One example embodiment of an aerosol delivery device 100 is illustrated in FIG. 1. In particular, FIG. 1 illustrates an aerosol delivery device 100 including a control body 200 and a cartridge 300. The control body 200 and the cartridge 300 can be permanently or detachably aligned in a functioning relationship. Various mechanisms may connect the cartridge 300 to the control body 200 to result in a threaded engagement, a press-fit engagement, an interference fit, a magnetic engagement, or the like. The aerosol delivery device 100 may be substantially rod-like, substantially tubular shaped, or substantially cylindrically shaped in some embodiments when the cartridge 300 and the control body 200 are in an assembled configuration. However, as noted above, various other configurations such as rectangular or fob-shaped may be employed in other embodiments. Further, although the aerosol delivery devices are generally described herein as resembling the size and shape of a traditional smoking article, in other embodiments differing configurations and larger capacity reservoirs, which may be referred to as "tanks," may be employed.

In specific embodiments, one or both of the cartridge 300 and the control body 200 may be referred to as being disposable or as being reusable. For example, the control body 200 may have a replaceable battery or a rechargeable battery and/or capacitor and thus may be combined with any type of recharging technology, including connection to a typical alternating current electrical outlet, connection to a car charger (i.e., cigarette lighter receptacle), and connection to a computer, such as through a universal serial bus (USB) cable. Further, in some embodiments the cartridge 300 may comprise a single-use cartridge, as disclosed in U.S. Pat. No. 8,910,639 to Chang et al., which is incorporated herein by reference in its entirety.

FIG. 2 illustrates an exploded view of the control body 200 of the aerosol delivery device 100 (see, FIG. 1) according to an example embodiment of the present disclosure. As illustrated, the control body 200 may comprise a coupler 202, an outer body 204, a sealing member 206, an adhesive member 208 (e.g., KAPTON® tape), a flow sensor 210 (e.g., a puff sensor or pressure switch), a control component 212, a spacer 214, an electrical power source 216 (e.g., a capacitor and/or a battery, which may be rechargeable), a circuit board with an indicator 218 (e.g., a light emitting diode (LED)), a connector circuit 220, and an end cap 222. Examples of electrical power sources are described in U.S. Pat. App. Pub. No. 2010/0028766 by Peckerar et al., the disclosure of which is incorporated herein by reference in its entirety.

With respect to the flow sensor 210, representative current regulating components and other current controlling components including various microcontrollers, sensors, and switches for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties. Reference also is made to the control schemes described in U.S. App. Pub. No. 2014/0270727 to Ampolini et al., which is incorporated herein by reference in its entirety.

In one embodiment the indicator 218 may comprise one or more light emitting diodes. The indicator 218 can be in communication with the control component 212 through the connector circuit 220 and be illuminated, for example, during a user drawing on a cartridge coupled to the coupler 202, as detected by the flow sensor 210. The end cap 222 may be adapted to make visible the illumination provided thereunder by the indicator 218. Accordingly, the indicator 218 may be illuminated during use of the aerosol delivery device 100 to simulate the lit end of a smoking article. However, in other embodiments the indicator 218 can be provided in varying numbers and can take on different shapes and can even be an opening in the outer body (such as for release of sound when such indicators are present).

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; and U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; WO 2010/091593 to Hon; and WO 2013/089551 to Foo, each of which is incorporated herein by reference in its entirety. A variety of the materials disclosed by the foregoing documents may be incorporated into the present devices in various embodiments, and all of the foregoing disclosures are incorporated herein by reference in their entireties.

FIG. 3 illustrates the cartridge 300 of the aerosol delivery device 100 (see, FIG. 1) in an exploded configuration. As illustrated, the cartridge 300 may comprise a base 302, a control component terminal 304, an electronic control component 306, a flow director 308, an atomizer 310, a reservoir 312 (e.g., a reservoir substrate), an outer body 314, a mouthpiece 316, a label 318, and first and second heating terminals 320, 321 according to an example embodiment of the present disclosure.

In some embodiments the first and second heating terminals 320, 321 may be embedded in, or otherwise coupled to, the flow director 308. For example, the first and second heating terminals 320, 321 may be insert molded in the flow director 308. Accordingly, the flow director 308 and the first and second heating terminals are collectively referred to herein as a flow director assembly 322. Additional description with respect to the first and second heating terminals 320, 321 and the flow director 308 is provided in U.S. Pat. Pub. No. 2015/0335071 to Brinkley et al., which is incorporated herein by reference in its entirety.

The atomizer 310 may comprise a liquid transport element 324 and a heating element 326. The cartridge may additionally include a base shipping plug engaged with the base and/or a mouthpiece shipping plug engaged with the mouthpiece in order to protect the base and the mouthpiece and prevent entry of contaminants therein prior to use as disclosed, for example, in U.S. Pat. No. 9,220,302 to Depiano et al., which is incorporated herein by reference in its entirety.

The base 302 may be coupled to a first end of the outer body 314 and the mouthpiece 316 may be coupled to an opposing second end of the outer body to substantially or fully enclose other components of the cartridge 300 therein. For example, the control component terminal 304, the electronic control component 306, the flow director 308, the atomizer 310, and the reservoir 312 may be substantially or entirely retained within the outer body 314. The label 318 may at least partially surround the outer body 314, and optionally the base 302, and include information such as a product identifier thereon. The base 302 may be configured to engage the coupler 202 of the control body 200 (see, e.g., FIG. 2). In some embodiments the base 302 may comprise anti-rotation features that substantially prevent relative rotation between the cartridge and the control body as disclosed in U.S. Pat. App. Pub. No. 2014/0261495 to Novak et al., which is incorporated herein by reference in its entirety.

The reservoir 312 may be configured to hold an aerosol precursor composition. Representative types of aerosol precursor components and formulations are also set forth and characterized in U.S. Pat. No. 7,726,320 to Robinson et al., U.S. Pat. No. 8,881,737 to Collett et al., and U.S. Pat. No. 9,254,002 to Chong et al.; and U.S. Pat. Pub. Nos. 2013/0008457 to Zheng et al.; 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC. Embodiments of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; U.S. Pat. No. 7,381,667 to Bergquist et al.; U.S. Pat. No. 8,424,541 to Crawford et al; and U.S. Pat. No. 8,627,828 to Strickland et al.; as well as US Pat. Pub. Nos. 2010/0018539 to Brinkley et al. and 2010/0170522 to Sun et al.; and PCT WO 97/06786 to Johnson et al., all of which are incorporated by reference herein. Additional description with respect to embodiments of aerosol precursor compositions, including description of tobacco or components derived from tobacco included therein, is provided in U.S. patent application Ser. Nos. 15/216,582 and 15/216,590, each filed Jul. 21, 2016 and each to Davis et al., which are incorporated herein by reference in their entireties.

The reservoir 312 may comprise a plurality of layers of nonwoven fibers formed into the shape of a tube encircling the interior of the outer body 314 of the cartridge 300. Thus, liquid components, for example, can be sorptively retained by the reservoir 312. The reservoir 312 is in fluid connection with the liquid transport element 324. Thus, the liquid transport element 324 may be configured to transport liquid from the reservoir 312 to the heating element 326 via capillary action or other liquid transport mechanism.

As illustrated, the liquid transport element 324 may be in direct contact with the heating element 326. As further illustrated in FIG. 3, the heating element 326 may comprise a wire defining a plurality of coils wound about the liquid transport element 324. In some embodiments the heating element 326 may be formed by winding the wire about the liquid transport element 324 as described in U.S. Pat. No. 9,210,738 to Ward et al., which is incorporated herein by reference in its entirety. Further, in some embodiments the wire may define a variable coil spacing, as described in U.S. Pat. No. 9,277,770 to DePiano et al., which is incorporated herein by reference in its entirety. Various embodiments of materials configured to produce heat when electrical current is applied therethrough may be employed to form the heating element 326. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials; and ceramic (e.g., a positive or negative temperature coefficient ceramic).

However, various other embodiments of methods may be employed to form the heating element 326, and various other embodiments of heating elements may be employed in the atomizer 310. For example, a stamped heating element may be employed in the atomizer, as described in U.S. Pat. App. Pub. No. 2014/0270729 to DePiano et al., which is incorporated herein by reference in its entirety. Further to the above, additional representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties. Further, chemical heating may be employed in other embodiments. Various additional examples of heaters and materials employed to form heaters are described in U.S. Pat. No. 8,881,737 to Collett et al., which is incorporated herein by reference, as noted above.

A variety of heater components may be used in the present aerosol delivery device. In various embodiments, one or more microheaters or like solid state heaters may be used. Microheaters and atomizers incorporating microheaters suitable for use in the presently disclosed devices are described in U.S. Pat. No. 8,881,737 to Collett et al., which is incorporated herein by reference in its entirety.

The first heating terminal 320 and the second heating terminal 321 (e.g., negative and positive heating terminals) are configured to engage opposing ends of the heating element 326 and to form an electrical connection with the control body 200 (see, e.g., FIG. 2) when the cartridge 300 is connected thereto. Further, when the control body 200 is coupled to the cartridge 300, the electronic control component 306 may form an electrical connection with the control body through the control component terminal 304. The control body 200 may thus employ the electronic control component 212 (see, FIG. 2) to determine whether the cartridge 300 is genuine and/or perform other functions. Further, various examples of electronic control components and functions performed thereby are described in U.S. Pat. App. Pub. No. 2014/0096781 to Sears et al., which is incorporated herein by reference in its entirety.

During use, a user may draw on the mouthpiece 316 of the cartridge 300 of the aerosol delivery device 100 (see, FIG. 1). This may pull air through an opening in the control body 200 (see, e.g., FIG. 2) or in the cartridge 300. For example, in one embodiment an opening may be defined between the coupler 202 and the outer body 204 of the control body 200 (see, e.g., FIG. 2), as described in U.S. Pat. No. 9,220,302 to DePiano et al., which is incorporated herein by reference in its entirety. However, the flow of air may be received through other parts of the aerosol delivery device 100 in other embodiments. As noted above, in some embodiments the cartridge 300 may include the flow director 308. The flow director 308 may be configured to direct the flow of air received from the control body 200 to the heating element 326 of the atomizer 310.

A sensor in the aerosol delivery device 100 (e.g., the flow sensor 210 in the control body 200; see, FIG. 2) may sense the puff. When the puff is sensed, the control body 200 may direct current to the heating element 326 through a circuit including the first heating terminal 320 and the second heating terminal 321. Accordingly, the heating element 326 may vaporize the aerosol precursor composition directed to an aerosolization zone from the reservoir 312 by the liquid transport element 324. Thus, the mouthpiece 326 may allow passage of air and entrained vapor (i.e., the components of the aerosol precursor composition in an inhalable form) from the cartridge 300 to a consumer drawing thereon.

Various other details with respect to the components that may be included in the cartridge 300 are provided, for example, in U.S. Pat. App. Pub. No. 2014/0261495 to DePiano et al., which is incorporated herein by reference in its entirety. Additional components that may be included in the cartridge 300 and details relating thereto are provided, for example, in U.S. Pat. Pub. No. 2015/0335071 to Brinkley et al., filed May 23, 2014, which is incorporated herein by reference in its entirety.

Various components of an aerosol delivery device according to the present disclosure can be chosen from components described in the art and commercially available. Reference is made for example to the reservoir and heater system for controllable delivery of multiple aerosolizable materials in an electronic smoking article disclosed in U.S. Pat. App. Pub. No. 2014/0000638 to Sebastian et al., which is incorporated herein by reference in its entirety.

In another embodiment substantially the entirety of the cartridge may be formed from one or more carbon materials, which may provide advantages in terms of biodegradability and absence of wires. In this regard, the heating element may comprise carbon foam, the reservoir may comprise carbonized fabric, and graphite may be employed to form an electrical connection with the power source and control component. An example embodiment of a carbon-based cartridge is provided in U.S. Pat. App. Pub. No. 2013/0255702 to Griffith et al., which is incorporated herein by reference in its entirety.

However, in some embodiments it may be desirable to provide aerosol delivery devices with additional user control. For example, it may be desirable to allow a user to control the type or intensity of flavor of the vapor produced by the aerosol delivery device. Accordingly, embodiments of the present of the present disclosure include features configured to allow a user to customize the operation of aerosol delivery devices.

In this regard, FIG. 4 schematically illustrates an embodiment of an aerosol delivery device 400 according to an example embodiment of the present disclosure. As illustrated in FIG. 4, the aerosol delivery device 400 may include an electrical power source 516, one or more atomizers 610, and one or more reservoirs 612. The aerosol delivery device 400 may further include any of the other components described above. Additionally, the aerosol delivery device 400 may include an atomizer selector 628. As described hereinafter, the atomizer selector 628 may be configured to allow a user to customize a vapor produced by the aerosol delivery device 400.

As illustrated, in one embodiment the aerosol delivery device 400 may include a control body 500, which may include the electrical power source 516. Further, the aerosol delivery device 400 may include a cartridge 600, which may include the one or more atomizers 610, the one or more reservoirs 612, and the atomizer selector 628. However, in other embodiments the aerosol delivery device may not include a separate cartridge and control body or the components of the cartridge and the control body may be distributed in a differing manner. For example, the atomizer selector may be partially or fully included in the control body.

FIG. 5 illustrates an embodiment of the aerosol delivery device 400' including a plurality of the atomizers 610 and a plurality of the reservoirs 612. Example embodiments of aerosol delivery devices including multiple atomizers are described in U.S. Pat. Appl. Pub. No. 2014/0000638 to Sebastian et al., which is incorporated herein by reference in its entirety. Each of the atomizers 610 may be in fluid communication with a respective one of the reservoirs 612. Further, the atomizer selector 628 may be configured to provide for selection of one or more of the atomizers 610 to which electrical current is directed to produce a vapor therefrom. In this regard, the electrical current may be provided by the electrical power source 516 and selectively directed to one or more of the atomizers 610 by the atomizer selector 628.

As may be understood, the atomizer selector 628 may selectively direct the electrical current to one or more of the atomizers 610 by any of a variety of mechanisms. In one embodiment selective direction of the electrical current to one or more of the atomizers 610 may be conducted mechanically. In this regard, FIG. 6 illustrates an embodiment of the atomizer selector 628*a* configured to mechanically select the one or more atomizers 610*a* to which the electrical current is directed. The atomizer selector 628*a* may include one or more guide tracks 630*a*, which may extend parallel to one another. First and second atomizers 610*a*', 610*a*" (collectively, "atomizers 610*a*") may be engaged with the guide tracks 630*a*. However, as may be understood, a greater number of atomizers may be engaged with the guide tracks 630*a* in other embodiments. Each of the atomizers 610*a* may include a liquid transport element 624*a*', 624*a*" and a heating element 626*a*', 626*a*" engaged therewith.

The atomizers 610*a* may be moveable relative to the guide tracks 630*a*. Each of the atomizers 610*a* may be moveable simultaneously, as a single unit, relative to the guide tracks 630*a*. In one embodiment the guide tracks 630*a* may move and the atomizers 610*a* may remain stationary. Alternatively, the guide tracks 630*a* may be stationary and the atomizers 610*a* may move. Regardless, relative motion between the guide tracks 630*a* and the atomizers 610*a* allows the atomizer selector 628*a* to selectively form an electrical connection with one or more of the atomizers. In this regard, the guide tracks 630*a* may respectively include one or more connection sections 632*a*. When one of the atomizers 610*a* engages the connection sections 632*a*, an electrical connection is formed therewith. Thereby, electrical current may be directed thereto. For example, the connection sections 632*a* may engage the ends of the heating elements of the atomizers 610*a*.

In this regard, FIG. 6 illustrates the atomizer selector 628*a* in an intermediate configuration wherein none of the atomizers 610*a* is engaged with the connection sections 632*a*. FIGS. 7 and 8 illustrate overhead views of the atomizer selector 628*a* in connected configurations. In particular, FIG. 7 illustrates the atomizer selector 628*a* and the atomizers 610*a* in a configuration wherein the first atomizer 610*a*' is engaged with the connection section 632*a*. In this configuration, the second atomizer 610*a*" is electrically disconnected. Thereby, electrical current may be directed to the first heating element 626*a*' to produce a vapor from the aerosol precursor composition retained in the one of the reservoirs 612*a* (see, FIG. 5) in fluid communication with the first liquid transport element 624*a*'. At this time electrical current may not be directed to the second heating element 626*a*", such that only the first heating element 626*a*' is activated.

Conversely, FIG. 8 illustrates the atomizer selector 628*a* and the atomizers 610*a* in a configuration wherein the second atomizer 610*a*" is engaged with the connection section 632*a*. In this configuration, the first atomizer 610*a*' is electrically disconnected. Thereby, electrical current may be directed to the second heating element 626*a*" to produce a vapor from the aerosol precursor composition retained in the one of the reservoirs 612*a* (see, FIG. 5) in fluid communication with the second liquid transport element 624*a*". At this time electrical current may not be directed to the first heating element 626*a*', such that only the second heating element 626*a*" is activated.

In some embodiments the atomizer selector 628*a* may be further configured to alter a position of the atomizers 610*a* with respect to an airflow path through the aerosol delivery device. In this regard, as further illustrated in FIGS. 7 and 8, the selected one of the atomizers 610*a* may be positioned in the airflow path through the aerosol delivery device. For example, as illustrated, in some embodiments the selected one of the atomizers 610*a* may be aligned with a flow director 608*a* by the atomizer selector 628*a*. Conversely, the one or more atomizers 610*a* that are not selected may be positioned outside of the airflow path through the aerosol delivery device or at a fringe thereof.

Note that in the embodiment described above, the atomizer selector 628*a* is configured to select one of the atomizers 610*a*, which is electrically connected and positioned in the airflow path. However, in other embodiments the atomizer selector may be configured to provide for selection of multiple atomizers 610*a*. For example, FIG. 9 illustrates an embodiment of the atomizer selector 628*b* wherein each guide track 630*b* includes multiple connection sections 632*b*', 632*b*". The atomizers 610*b* may be moveable relative to the guide tracks 630*b* such that multiple atomizers may be engaged with the connection sections at the same time. However, as may be understood, the atomizers 610*b* may be moved relative to the guide rails to select an individual atomizer.

For example, FIG. 10 illustrates the atomizer selector 628*b* and the atomizers 610*b* in a configuration wherein the first atomizer 610*b*' is engaged with a first connection section 632*b*'. In this configuration, the second atomizer 610*b*" is electrically disconnected. Thereby, electrical current may be directed to the first atomizer 610*b*'. Conversely, FIG. 11 illustrates the atomizer selector 628*b* and the atomizers 610*b* in a configuration wherein the second atomizer 610*b*" is engaged with a second connection section 632*b*". In this configuration, the first atomizer 610*b*' is electrically disconnected. Thereby, electrical current may be directed to the second heating element 626*b*". Accordingly, one or more of the atomizers 610*b* may be selected for atomization. As further illustrated in FIGS. 9-11, the selected atomizers 610*b* may be aligned with the airflow path through the aerosol delivery device, whereas the atomizers that are not selected may be moved outside of the airflow path or to the fringe thereof.

Movement of the atomizers relative to the guide tracks in the embodiments described above may occur via a variety of actuators. For example a knob may be rotated to move the atomizers relative to the guide tracks. However, in other embodiments a slider, a switch, or any other actuator may move the atomizers relative to the guide tracks. Further, although guide tracks defining a curved configuration are illustrated, various other mechanisms may be employed in other embodiments with corresponding actuators such as switches, sliders, or any other actuator which may provide for any type of relative motion. Thus, for example, movements of the atomizer selector and/or atomizers may be linear or rotational and may involve axial pushing/pulling of the actuator and/or rotation thereof.

A user may be provided with feedback when the atomizers 610*a*, 610*b* engage the connection sections 632*a*, 632*b*. The feedback may be mechanical. For example, when one of the atomizers engages one of the connection sections, additional effort may be required to cause relative movement between the atomizers and the guide tracks. Additionally or alternatively, the feedback may be electrical. For example, the aerosol delivery device may include an indicator that indicates which atomizer(s) is/are engaged with the connection sections. In another embodiment the feedback may comprise haptic feedback as described, for example, in U.S. Pat. Appl. Pub. No. 2015/0020825 to Galloway et al., which is incorporated herein by reference in its entirety.

As described above, in one embodiment the atomizer selector may selectively direct the electrical current to one or more of the atomizers via a mechanical apparatus that may move the atomizers relative to one or more guide tracks. However, in other embodiments the selective direction of the current to one more of the atomizers may be conducted electrically.

In this regard, FIG. 12 illustrates an atomizer selector 628*c* according to an additional example embodiment of the present disclosure. In this embodiment the atomizer selector 628*c* comprises a switch 634*c*. The atomizer selector 628*c* may further include a first contact 636*c*' and a second contact 636*c*". The first contact 636*c*' may be electrically connected to a first atomizer 610*c*'. The second contact 636*c*" may be electrically connected to a second atomizer 610*c*". Thereby, the switch 634*c* may be employed to provide for selection of which of the atomizers 610*c*', 610*c*" to which electrical current is directed. In this regard, as illustrated in FIG. 12, when the switch 634*c* engages the first contact 636*c*', electrical current may be directed to the first atomizer 610*c*'. Conversely, as illustrated in FIG. 13, when the switch 634*c* engages the second contact 636*c*", electrical current may be directed to the second atomizer 610*c*".

Further, in some embodiments the switch 634*c* may allow for simultaneous selection of multiple atomizers, in order to direct current to the multiple atomizers simultaneously when selected by the user. In this regard, the atomizer selector 628*c* may further comprise a third contact 636*c*'''. The third contact 636*c*''' may be electrically connected to both the first atomizer 610*c*' and the second atomizer 610*c*". Thereby, as illustrated in FIG. 14, when the switch 634*c* engages the third contact 636*c*''', electrical current may be directed to the first atomizer 610*c*' and the second atomizer 610*c*". Accordingly, the atomizer selector 628*c* may provide for selection of one or more of the atomizers 610*c*', 610*c*" to which electrical current is directed and which may be in fluid communication with a respective reservoir 612 (see, FIG. 5) to produce a vapor therefrom.

As illustrated in FIGS. 15-17, in some embodiments the atomizer selector 628*d* may further comprise a valve 638*d* configured to selectively direct the airflow path at one or more of the atomizers 610*d*', 610*d*". FIG. 15 illustrated the valve 638*d* in a neutral configuration, which may be employed when the switch 634*d* engages the third contact 636*d*'''. Thereby, the airflow may be directed around the valve 638*d* to each of the atomizers 610*d*', 610*d*", to which the electrical current is also directed. However, when the electrical current is directed to the first atomizer 610*d*', as illustrated in FIG. 16, the valve 638*d* may block flow to the second atomizer 610*d*" or otherwise directed airflow to the first atomizer 610*d*'. Conversely, when the electrical current is directed to the second atomizer 610*d*", as illustrated in FIG. 17, the valve 638*d* may block flow to the first atomizer 610*d*' or otherwise directed airflow to the second atomizer 610*d*".

Additionally, although a single valve is described above as directing the airflow, in another embodiment the atomizer selector may include multiple valves. For example, as illustrated in the atomizer selector 628*e* of FIGS. 18-20, each atomizer 610*e*', 610*e*" may include a valve 638*e*', 638*e*" associated therewith. By way of further example, each atomizer 610', 610" may include a respective flow director 608*e*', 608*e*" configured to direct airflow thereto, and each flow director may include one of the valves 638*e*', 638*e*" associated therewith, such that airflow may be selectively directed to one or more of the atomizers.

In this regard, FIG. 18 illustrates each of the valves 638*e*', 638*e*" in an open configuration such that airflow may be directed through the flow directors 608*e*', 608*e*" to each of the atomizers 610*e*', 610*e*". Further, the switch 634*e* is configured to direct electrical current to each of the atomizers 610*e*', 610*e*" via the third contact 636*e*''', such that each of the atomizers may be activated. FIG. 19 illustrates the first valve 638*e*' in an open configuration and the second valve 638*e*" in a closed configuration such that airflow may be directed through the first flow director 608*e*' to the first atomizer 610*e*', but not through the second flow director 638*e*" to the second atomizer 610*e*". Further, the switch 634*e* is configured to direct electrical current to only the first atomizer 610*e*' via the first contact 636*e*'. Conversely, FIG. 20 illustrates the second valve 638*e*" in an open configuration and the first valve 638*e*' in a closed configuration such that airflow may be directed through the second flow director 608*e*" to the second atomizer 610*e*", but not through the first flow director 638*e*' to the first atomizer 610*e*'. Further, the switch 634*e* is configured to direct electrical current to only the second atomizer 610*e*' via the second contact 636*e*". Thus, the airflow and electrical current may be selectively directed to one or more of the atomizers 610*e* using the atomizer selector 628*e* comprising a plurality of valves 638*e*', 638*e*" and the switch 634*e* in some embodiments.

Note that although the switches are schematically illustrated as a manual switch, the switches may comprise a circuit or circuit board performing the same function. Thus, for example, the switches may perform the switching function fully electronically, without requiring a mechanical movement, in some embodiments. Further, although one or more valves are described as being employed to direct airflow to one or more selected atomizers, in other embodiments the position of the atomizers may be adjusted in order to move the atomizers into and out of the airflow in a manner corresponding to that described above.

An aerosol delivery device 700 according to an additional example embodiment of the present disclosure is illustrated in FIG. 21. As schematically illustrated, the aerosol delivery device 700 may include an electrical power source 816, one or more atomizers 910, and one or more reservoirs 912. The aerosol delivery device 700 may further include any of the other components described above. Additionally, the aerosol delivery device 700 may include an additive selector 928. As described hereinafter, the additive selector 928 may be configured to allow a user to customize a vapor produced by the aerosol delivery device 700 by providing for selection of one or more of a plurality of additives added to the vapor produced by the atomizer(s) 910 from the aerosol precursor composition retained in the reservoir(s) 912.

As illustrated, in one embodiment the aerosol delivery device 700 may include a control body 800, which may include the electrical power source 816. Further, the aerosol delivery device 700 may include a cartridge 900, which may include the one or more atomizers 910, the one or more reservoirs 912, and the additive selector 928. However, in other embodiments the aerosol delivery device may not include a separate cartridge and control body or the components of the cartridge and the control body may be distributed in a differing manner. For example, the additive selector may be partially or fully included in the control body.

As illustrated in FIG. 22, in some embodiments the additive selector 928 may be positioned downstream of the atomizer(s) 910. Thereby, the one or more additives produced by the additive selector 928 may be added to the vapor produced by the atomizer 910. However, in another embodiment the additive selector may be positioned upstream of the atomizer or at substantially the same location along the airflow path. Thus, the vapor and the additive selected may combine regardless of the relative positions of the atomizer(s) 910 and the additive selector 928. However, positioning the additive selector 928 downstream of the atomizer(s) 910 may be employed to release the additive from the additive selector 928 due, for example, to the heat and/or moisture provided by the vapor thereto.

In some embodiments the vapor produced by the atomizer(s) 910 may be flavorless and/or lack an active ingredient. In this embodiment, the additive selector 928 may add a flavor and/or active ingredient (e.g., a medication or nicotine) thereto. Thereby, a universal aerosol precursor composition may be used with any of a variety of additives.

FIG. 23 illustrates an embodiment of the additive selector 928*a*, wherein the additive selector comprises a bed of solids 940*a*. As noted above, the additive selector 928*a*, and hence the bed of solids 940*a*, may be positioned downstream of the at least one atomizer 910 (see, FIG. 22) in terms of an airflow path through the aerosol delivery device 700 (see, FIG. 21). The bed of solids 940 may include a plurality of compartments 942*a*', 942*a*", 942*a*"' (collectively and generically, "compartments 942*a*"). In this regard, a divider 944*a* may include one or more partitions 946*a*', 946*a*", 946*a*"" (collectively and generically, "partitions 946*a*") that separate the compartments 942*a*. In the illustrated embodiment the divider 944*a* includes three partitions 946*a* that divide the additive selector 928*a* into three compartments 942*a*. However, in other embodiments a greater or lesser number of partitions and corresponding compartments may be employed.

Each of the compartments 942*a* may include one or more solids 948*a*', 948*a*", 948*a*"' (collectively and generically, "solids 948*a*"). In some embodiments the solids 948*a* received in one of the compartments 942*a* may differ from the solids received in each of the other compartments. Various embodiments of the solids 948*a* may be employed in the bed of solids 940*a*. In one embodiment the solids 948*a* may comprise a plurality of flavor-laden plastic solids. The solids may be provided in various forms including, by way of example, beads, pellets, shreds, or a porous monolith.

The aerosol delivery device 700, and in particular the cartridge 900 (see, FIG. 21), may further include a flow director. As illustrated in FIG. 23, the flow director 908*a* may direct airflow toward the additive selector 928*a*. Thus, in terms of the perspective illustrated in FIG. 23, airflow is directed into the page.

The additive selector 928*a* may be configured to selectively align the flow director 908*a* with one or more of the compartments 942*a*. For example, in FIG. 23 the flow director 908*a* is aligned with the first compartment 942*a*'. However, by rotating or otherwise moving the additive selector 928*a* relative to the flow director 908*a*, the flow director may be selectively aligned with any one of the other compartments 942*a*. Thereby, the additive selector 928*a* may add a selected one of a plurality of additives to the vapor produced by the atomizer(s) 910 (see, e.g., FIG. 22). In some embodiments an actuator (e.g., an electric motor) may move the additive selector relative to the flow director, whereas in other embodiments the additive selector may be manually moveable relative to the flow director.

Further, in some embodiments the flow director 908*a* may be selectively aligned with multiple compartments 942*a*. For example, FIG. 24 illustrates the flow director 908*a* selectively aligned with a portion of the second compartment 942*a*" and a portion of the third compartment 942*a*"'. Accordingly, multiple additives may be added to the vapor at the same time in some positions of the flow director 908*a* relative to the additive selector 928*a*.

As noted above, in some embodiments the flow director 908*a* may be aligned with one or more of the compartments 942*a* of the additive selector 928*a*. Thereby, one or more additives may be added to the vapor directed through the one or more selected compartments 942*a* by the one or more corresponding solids 948*a*.

FIG. 25 illustrates an additional embodiment of the additive selector 928*b*. As illustrated, the additive selector 928*b* may further include one or more additive heating elements 950*b*', 950*b*", 950*b*"' (collectively and generically, "heating elements 950*b*"). The additive heating elements 950*b* may be configured to selectively heat one or more portions of the bed of solids 940*b*. In this regard, the first additive heating element 950*b*' may be configured to heat the solids 948*b*' received in the first compartment 942*b*', the second additive heating element 950*b*" may be configured to heat the solids 948*b*" received in the second compartment 942*b*", and the third additive heating element 950*b*"' may be configured to heat the solids 948*b*"' received in the third compartment 942*b*". Accordingly, one or more of the additive heating elements 950*b* may be selectively activated to heat the solids 948*b* in the one or more corresponding compartments 942*b*. Thereby, heat produced by one or more of the additive heating elements 942*b* may release one or more additives from the bed of solids 940*b* that is added to the vapor produced by the atomizer(s) 910 (see, e.g., FIG. 22).

In this embodiment the additive selector 928*b* may be stationary relative to the atomizers 910 (see, e.g., FIG. 22). In this regard, one or more of the heating elements 950*b* may produce the additive, such that selective direction of the airflow through one or more portions of the bed of solids 940*b* may not be required. However, in some embodiments the additive selector 928*b* may be moveable relative to the atomizer(s) 910. Thereby, the airflow may be directed to the one or more compartment(s) 942*b* at which a heating element 950*b* is activated. Thus, for example, the flow director 908*b* may be included in the aerosol delivery device 700 (see, FIG. 21) to direct airflow to the one or more compartment(s) 942*b* at which a heating element 950*b* is activated.

In the embodiment illustrated in FIG. 25, airflow occurs into the page in terms of the illustrated orientation. In this regard, each of the compartments 942*b* is positioned beside one another, at the same point along the longitudinal length of the aerosol delivery device. Thus, the compartments 942*b* may be laterally distributed across the width of the aerosol delivery device.

However, the compartments may be positioned relative to one another in other manners. For example, FIG. 26 illustrates an embodiment of the additive selector 928*c* including a bed of solids 940*c*. As noted above, the additive selector 928*c*, and hence the bed of solids 940*c*, may be positioned downstream of the at least one atomizer 910 (see, FIG. 22) in terms of an airflow path through the aerosol delivery device 700 (see, FIG. 21). The bed of solids 940*c* may include a plurality of compartments 942*c*', 942*c*'', 942*c*''' (collectively and generically, "compartments 942*c*"). In this regard, one or more partitions 946*c*', 946*c*'' (collectively and generically, "partitions 946*c*") may separate the compartments 942*c*. In the illustrated embodiment two partitions 946*c* divide the bed of solids 940*c* into three compartments 942*c*. However, in other embodiments a greater or lesser number of partitions and corresponding compartments may be employed.

Each of the compartments 942*c* may include one or more solids 948*c*', 948*c*'', 948*c*''' (collectively and generically, "solids 948*c*"). In some embodiments the solids 948*c* received in one of the compartments 942*b* may differ from the solids received in each of the other compartments. Various embodiments of the solids 948*c* may be employed in the bed of solids. In one embodiment the solids 948*c* may comprise a plurality of flavor-laden plastic solids. The solids may be provided in various forms including, by way of example, beads, pellets, shreds, or a porous monolith.

The additive selector 928*c* may further include one or more additive heating elements 950*c*', 950*c*'', 950*c*''' (collectively and generically, "heating elements 950*c*"). The additive heating elements 950*c* may be configured to selectively heat one or more portions of the bed of solids 940*c*. In this regard, the first additive heating element 950*c*' may be configured to heat the solids 948*c*' received in the first compartment 942*c*', the second additive heating element 950*c*'' may be configured to heat the solids 948*c*'' received in the second compartment 942*c*'', and the third additive heating element 950*c*''' may be configured to heat the solids 948*c*''' received in the third compartment 942*c*'''. Accordingly, one or more of the additive heating elements 950*c* may be selectively activated to heat the solids 948*c* in the one or more corresponding compartments 942*c*. Thereby, heat produced by one or more of the additive heating elements 942*c* may release one or more additives from the bed of solids 940*c* that is added to the vapor produced by the atomizer(s) 910 (see, e.g., FIG. 22).

Thus, the additive selector 928*c* may be substantially similar to the additive selector 928*b* of FIG. 25. However, as noted above, the additive selector 928*b* of FIG. 25 is configured with the compartments 942*b* distributed laterally across the width of the aerosol delivery device. Thus, the additive selector 928*c* of FIG. 26 differs in that the compartments 942*c* are distributed longitudinally along the longitudinal length of the aerosol delivery device. In this regard, airflow may be directed through the first compartment 942*c*' into the second compartment 942*c*'', and then into and out of the third compartment 942*c*''. Thus, the compartments of the bed of solids including heating elements that release additives may be distributed in any of various manners in view of the additive being released into the vapor when one or more of the heaters are activated. In this regard, release of the additive does not require selective airflow therethrough.

As described above, in some embodiments of the present disclosure an aerosol delivery device may include an atomizer configured to produce a vapor from an aerosol precursor composition retained in a reservoir and an additive selector including a bed of solids configured to add an additive to the vapor. Various other details with respect to hybrid aerosol delivery devices, including embodiments of solids that may be included in the bed of solids are provided in U.S. Pat. App. Pub. Nos. 2015/0335070 and 2016/0073695 to Sears et al.

As noted above, embodiments of the present disclosure provide an additive selector including one or more additive heating elements that heat solids to produce one or more additives. Although the solids are described above as generally being received in a bed of solids, in other embodiments the configuration may vary. For example, as noted above, flavor-laden plastic solids may be heated to release an additive. In some embodiments one or more components of the aerosol delivery device (e.g., the mouthpiece and/or the flow director) may comprise flavor-laden plastic. Thereby, one or more additive heating elements and/or heat from the atomizer may be employed to heat the one or more components to release the additive. Further, one or more valves may be employed to selectively direct air to the components that are heated and produce an additive. In some embodiments such components including flavor-laden plastic may be replaceable or removable in order to allow a user to replenish or change the additive.

FIG. 27 illustrates an additional embodiment of the additive selector 928*d*. As illustrated, the additive selector 928*d* may include one or more bubble jet heads 952*d*', 952*d*'', 952*d*''' (collectively and generically, "bubble jet heads 952*d*"). The bubble jet heads 952*d* may be configured to provide for selection of one or more of a plurality of additives added to the vapor produced by the atomizer(s) 910 (see, e.g., FIG. 22).

Each of the bubble jet heads 952*d* may be in fluid communication with a respective additive reservoir 954*d*', 954*d*'', 954*d*''' (collectively and generically, "additive reservoirs 954*d*"). The additive reservoirs 954*d* may each contain an additive fluid (e.g., a flavor and/or active ingredient) which may be dispensed by the bubble jet heads 952*d* into the vapor produced by the atomizer(s) 910 (see, e.g., FIG. 22). In some embodiments the additive fluids retained in each of the additive reservoirs 954*d* may differ from one another. Accordingly, one or more of the bubble jet heads 952*d* may be selectively activated to add one or more additives to the vapor.

FIG. 28 illustrates an additional embodiment of the aerosol delivery device 700*e*. As illustrated, the atomizer 910*e* may comprise a Venturi nozzle 956*e*. When a user draws on the aerosol delivery device 700*e*, aerosol precursor composition may be drawn from the reservoir 912*e* through the Venturi nozzle 956*e*. The Venturi nozzle 956*e* may include a restriction 958*e* that accelerates the flow of the aerosol precursor composition therethrough and produces an area of low pressure. The low pressure may draw in outside air through an air inlet 960*e* that mixes with the aerosol precursor composition to produce a vapor.

Further, the additive selector 928*e* may be configured to provide for selection of one or more of a plurality of additives added to the vapor. In this regard, the additive selector 928*e* may comprise a plurality of channels 962*e*', 962*e*'' (collectively and generically, "channels 962*e*") each configured to be in fluid communication with one of a plurality of additive reservoirs 954*e*', 954*e*'' (collectively, "additive reservoirs 954_e_") and selectively configurable to be in fluid communication with the Venturi nozzle 956_e_.

In this regard, the additive selector 910_e_ may further comprise an additive valve 964_e_. The additive valve 964_e_ may include at least one opening 966_e_ configured to be selectively aligned with one or more of the channels 962_e_. For example, in FIG. 28 the first channel 962_e_' is in fluid communication with the Venturi nozzle 956_e_ via the opening 966_e_ in the additive valve 964_e_, whereas the second channel 962_e_" is out of fluid communication with the Venturi nozzle. Conversely, in FIG. 29 the second channel 962_e_" is in fluid communication with the Venturi nozzle 956_e_ via the opening 966_e_ in the additive valve 964_e_, whereas the first channel 962_e_' is out of fluid communication with the Venturi nozzle.

Thus, when one or more of the channels 962_e_ is in fluid communication with the Venturi nozzle 956_e_ and the user draws on the aerosol delivery device 700_e_, the low pressure at the restriction 958_e_ may draw a fluid additive from each additive reservoir 954_e_ in fluid communication therewith into the Venturi nozzle. Thereby, the one or more fluid additives may be vaporized and added to the vapor produced from the aerosol precursor composition received from the reservoir 912_e_. Note that the restriction 958_e_ and/or the channels 962_e_ may comprise capillary tubes configured to resist flow therethough except when a user draws on the aerosol delivery device 700_e_ in order to prevent leakage therefrom.

FIG. 30 illustrates an additional embodiment of the additive selector 928_f_. As illustrated, the additive selector 928_f_ may include at least one additive reservoir 954_f_', 954_f_" (collectively and generically, "additive reservoirs 954_f_"). The additive reservoirs 954_f_ may each contain an additive fluid (e.g., a flavor and/or active ingredient). In some embodiments the additive fluids retained in each of the additive reservoirs 954_f_ may differ from one another.

Each additive reservoir 954_f_ may be in fluid communication with a respective channel 962_f_', 962_f_" (collectively and generically, "channels 962_f_"). In the illustrated embodiment the additive selector 928_f_ includes two additive reservoirs 954_f_ and two corresponding channels 962_f_. However, a greater or lesser number of additive reservoirs and channels may be employed in other embodiments.

As illustrated in FIG. 30, the additive selector 928_f_ may further include at least one crystal oscillator 968_f_. The crystal oscillator 968_f_ may be configured to ultrasonically vibrate in contact with one or more of the channels 962_f_ and/or the additive fluid received therein. For example, in one embodiment the crystal oscillator 968_f_ may comprise a vibratory screen in fluid communication with one or more of the channels 962_f_. Thereby, the additive fluid in the one or more channels 962_f_ in contact with the crystal oscillator 968_f_ may be atomized to produce one or more additives added to the vapor produced by the atomizer(s) 910 (see, e.g., FIG. 22). In one embodiment a separate crystal oscillator may be associated with each of the channels, such that the crystal oscillators may be selectively activated to produce one or more additives. In another embodiment a single crystal oscillator may be employed to selectively atomize the additive fluid in one or more of multiple channels.

In this regard, the crystal oscillator 968_f_ may be moveable relative to the channels 962_f_. For example, FIG. 31 illustrates the crystal oscillator 968_f_ in contact with the first channel 962_f_' in order to atomize the fluid additive retained in the first additive reservoir 954_f_'. However, as may be understood, the crystal oscillator 968_f_ may be moved relative to the second channel 962_f_" so as to additionally or alternatively atomize the fluid additive retained in the second additive reservoir 954_f_".

The embodiments of the additive selectors 928_d-f_ described above with respect to FIGS. 27-31 may produce additives having a relatively large droplet size. Usage of relatively large droplets or particles may desirable in embodiments wherein the additive is configured to provide a flavor. In this regard, relatively larger droplets and particles may be easier for flavor receptors to recognize, and thus may provide a stronger flavor.

Embodiments of the aerosol delivery devices described above include an additive selector. In some embodiments the additive selector or a portion thereof (e.g., the bed of solids) may be detachable, refillable, and/or replaceable. Thereby, the additive may be replenished or exchanged for a differing type thereof. In some embodiments the additive may be configured for a single use (e.g., a single puff), which may be useful when the additive comprises a medication in order to provide the correct dosage thereof without risk of an overdose.

Embodiments of aerosol delivery devices described above include multiple atomizers. In some embodiments two or more of the atomizers may be operated simultaneously. In these embodiments the volume of vapor produced by the atomizers may be adjusted. For example, the amount of electrical current directed to each of the atomizers may be separately adjustable by the user. Further, in some embodiments of the aerosol delivery devices described above including multiple atomizers, the atomizers or components thereof (e.g., a liquid transport element and/or heating element) may be differently sized such that two or more atomizers define differing sizes and/or other properties.

In the embodiments described above, various atomizer selectors are employed to select atomizers, additives, valves, etc., in order to customize the operation of aerosol delivery devices. Such selections may be conducted mechanically, electrically, or via a combination thereof. In some embodiments an application may be provided that allows a mobile phone or other electronic device to communicate with the aerosol delivery device and make such selections via the application. Thereby, the atomizer selectors may be controlled via the application in some embodiments.

As described above, various embodiments of additives may be employed. By way of example, the additives may comprise flavors or active ingredients such as pharmaceuticals (e.g., albuterol or nicotine). Example flavors may include vanillin, ethyl vanillin, cream, tea, coffee, fruit (e.g., banana, berry, apple, cherry, strawberry, peach and citrus flavors, including lime and lemon), maple, menthol, chocolate, mint, peppermint, spearmint, wintergreen, nutmeg, clove, lavender, cardamom, ginger, honey, anise, sage, cinnamon, sandalwood, jasmine, cascarilla, cocoa, licorice, and flavorings of the type and character traditionally used for the flavoring of cigarette, cigar and pipe tobaccos.

In an additional aspect a method for vapor production with an aerosol delivery device is provided. As illustrated in FIG. 32, the method may include providing for selection of one or more of a plurality of atomizers at operation 1002. Further, the method may include altering a position of the atomizers with respect to an airflow path through the aerosol delivery device at operation 1004. The method may additionally include directing electrical current to the one or more of the atomizers selected to produce a vapor at operation 1006.

In some embodiments altering a position of the atomizers with respect to the airflow path through the aerosol delivery device at operation 1004 may include selectively directing the airflow path at the one or more of the atomizers selected with the valve. Further, directing electrical current to the one or more of the atomizers selected to produce the vapor at operation 1006 comprises selectively forming an electrical connection with the one or more of the atomizers selected. The method may further include providing for selection of one or more of a plurality of additives and adding the one or more additives selected to the vapor.

In an additional aspect a method for vapor production with an aerosol delivery device is provided. As illustrated in FIG. 33, the method may include providing for selection of one or more of a plurality of additives at operation 1102. Further, the method may include producing a vapor with at least one atomizer from an aerosol precursor composition at operation 1104. The method may additionally include adding the one or more additives selected to the vapor.

In some embodiments the method may further comprise forming the one or more additives from a bed of solids. Providing for selection of one or more of the additives at operation 1102 may include providing for selective alignment of a Venturi nozzle with one or more channels respectively in fluid communication with one of a plurality of additive reservoirs. Further, adding the one or more additives selected to the vapor at operation 1106 may include activating at least one crystal oscillator. Producing the vapor with at least one atomizer at operation 1104 may include providing for selection of one or more of a plurality of atomizers. The method may further include altering a position of the atomizers with respect to an airflow path through the aerosol delivery device and directing electrical current to the one or more of the atomizers selected to produce a vapor.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device, comprising:

a plurality of atomizers;

a single atomizer selector comprising a movable actuator arranged to move in order to selectively form an electrical connection between one or more of the atomizers and a power source to produce a vapor from the one or more atomizers, wherein the actuator comprises a single switch in electrical communication with the power source and comprising a plurality of contacts configured to correspond to one or more of the atomizers such that the selector may provide for selection of one or more of the atomizers to which electrical current is directed to via one or more of the plurality of contacts; and an additive selector configured to provide for selection of one or more of a plurality of additives to be added to the vapor, wherein the additive selector comprises a plurality of compartments, each compartment configured to hold one or more additives and a second actuator configured to selectively align one or more of the compartments with an airflow director to introduce the one or more of the additives to the vapor.

2. The aerosol delivery device of claim 1, wherein each of the atomizers comprises a heater and a liquid transport element configured to deliver an aerosol precursor to its respective heater.

3. The aerosol delivery device of claim 2, wherein the liquid transport elements are configured to be in fluid communication with one or more reservoirs containing an aerosol precursor composition.

4. The aerosol delivery device of claim 1, wherein the atomizer selector further comprises a valve configured to selectively direct an airflow path at one or more of the atomizers.

5. The aerosol delivery device of claim 1 further comprising mechanical or electrical feedback to indicate when the one or more atomizers has engaged an electrical contact.

6. The aerosol delivery device of claim 1, wherein the additive selector is positioned downstream of at least one atomizer relative to an airflow path.

7. The aerosol delivery device of claim 1, wherein the additive selector is positioned upstream of at least one atomizer relative to an airflow path.

8. The aerosol delivery device of claim 1, wherein the additive selector further comprises a bed of solids.

9. The aerosol delivery device of claim 8, wherein the bed of solids is disposed within the plurality of compartments and separated by one or more partitions.

10. The aerosol delivery device of claim 8, wherein the additive selector further comprises one or more additive heating elements configured to selectively heat one or more portions of the bed of solids.

11. The aerosol delivery device of claim 8, wherein the bed of solids comprises a plurality of flavor-laden plastic solids.

12. The aerosol delivery device of claim 1, wherein the second actuator of the additive selector is also configured to selectively align an airflow path relative to the one or more of the compartments.

13. The aerosol delivery device of claim 1, wherein the additive selector is configured to be manually moveable relative to the airflow path.

14. The aerosol delivery device of claim 1, wherein the additive selector may be selectively aligned such that multiple compartments align with the airflow path.

15. The aerosol delivery device of claim 1 further comprising:

a control body configured to house the power supply; and a cartridge configured to be coupled to the control body and to house the plurality of atomizers and the atomizer selector.

16. The aerosol delivery device of claim 1, wherein the additive selector is positioned downstream of at least one atomizer relative to an airflow path.

17. The aerosol delivery device of claim 1, wherein the additive selector is positioned upstream of at least one atomizer relative to an airflow path.

18. An aerosol delivery device, comprising:

a plurality of atomizers; and an atomizer selector comprising an actuator configured to selectively form an electrical connection between one or more of the atomizers and a power source to produce a vapor from the one or more atomizers, wherein the atomizer selector further comprises a guide track movable relative to each of the atomizers such that the relative movement between the guide track and the atomizers enables the atomizer selector to selectively form an electrical connection between the power source and one or more of the atomizers.

19. The aerosol delivery device of claim 18, wherein the actuator includes a switch in electrical communication with the power source and comprising a plurality of contacts configured to correspond to one or more of the atomizers such that the selector may provide for selection of one or more of the atomizers to which electrical current is directed to via one or more of the plurality of contacts.

20. The aerosol delivery device of claim 18, further comprising mechanical or electrical feedback to indicate when the one or more atomizers has engaged an electrical contact.

21. The aerosol delivery device of claim 18, further comprising:

a control body configured to house the power source; and a cartridge configured to be coupled to the control body and to house the plurality of atomizers and the atomizer selector.

22. The aerosol delivery device of claim 18, wherein each of the plurality of atomizers comprises a heater and a liquid transport element configured to deliver an aerosol precursor to its respective heater.

23. The aerosol delivery device of claim 22, wherein the liquid transport elements are configured to be in fluid communication with one or more reservoirs containing an aerosol precursor composition.

24. The aerosol delivery device of claim 18, wherein the atomizer selector further comprises a valve configured to selectively direct an airflow path at one or more of the plurality of atomizers.

* * * * *